US012812022B2

(12) United States Patent
Chadha et al.

(10) Patent No.: US 12,812,022 B2
(45) Date of Patent: Nov. 24, 2026

(54) COMPRESSION OF SPARSE COMMUNICATIONS OVER A CHIP-TO-CHIP (C2C) INTERCONNECT

(71) Applicant: NVIDIA Corporation, Santa Clara, CA (US)

(72) Inventors: Ish Chadha, San Jose, CA (US); Adithya Hrudhayan Krishnamurthy, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/975,932

(22) Filed: Dec. 10, 2024

(65) Prior Publication Data

US 2026/0163964 A1 Jun. 11, 2026

(51) Int. Cl.

| | |
|---|---|
| ***G06F 15/16*** | (2006.01) |
| ***H04L 67/561*** | (2022.01) |
| ***H04L 69/04*** | (2022.01) |
| ***H04L 69/22*** | (2022.01) |

(52) U.S. Cl.

CPC ............ *H04L 69/04* (2013.01); *H04L 67/561* (2022.05); *H04L 69/22* (2013.01)

(58) Field of Classification Search

CPC ........ H04L 69/04; H04L 67/561; H04L 69/22

See application file for complete search history.

(56) References Cited

U.S. PATENT DOCUMENTS

2012/0053948 A1* 3/2012 Mustiere ................ H03M 7/30 341/87
2019/0012296 A1* 1/2019 Hsieh ...................... G06F 17/16
2020/0272425 A1* 8/2020 Latorre ..................... G06F 7/57
2021/0157485 A1* 5/2021 Tomei .................. G06F 3/0608
2025/0292350 A1* 9/2025 Wibowo ................ G06F 17/16

* cited by examiner

*Primary Examiner* — Padma Mundur

(74) *Attorney, Agent, or Firm* — Lowenstein Sandler LLP

(57) ABSTRACT

A transmitter device includes transmitter logic coupled to control logic, the control logic to receive data to be sent via a communication network, determine whether a first portion of the data matches a first data pattern, identify a first index corresponding to the first portion of the data, generate metadata for the data based on the first index, generate compressed data by removing the first portion of the data from the first index of the data, generate a compressed data signal based on the compressed data and the metadata, and cause the compressed data signal to be transmitted via the communication network.

34 Claims, 15 Drawing Sheets

COMPRESSION OF SPARSE COMMUNICATIONS OVER A CHIP-TO-CHIP (C2C) INTERCONNECT

TECHNICAL FIELD

At least one embodiment pertains processor communications over a link, such as a datalink. For example, at least one embodiment pertains to compression of sparse communications over a chip-to-chip (C2C) interconnect.

BACKGROUND

In certain communication interconnect systems, such as chip-to-chip (C2C) interconnects, or die-to-die (D2D) interconnects, data transmitted across a link is often segmented into smaller units, commonly known as "frames," to facilitate efficient data handling. Frames can be encrypted to provide enhanced security for data transmission across the communication interconnect.

BRIEF DESCRIPTION OF DRAWINGS

Various embodiments in accordance with aspects of the disclosure will be described with reference to the drawings, in which.

DETAILED DESCRIPTION

Figure 1:
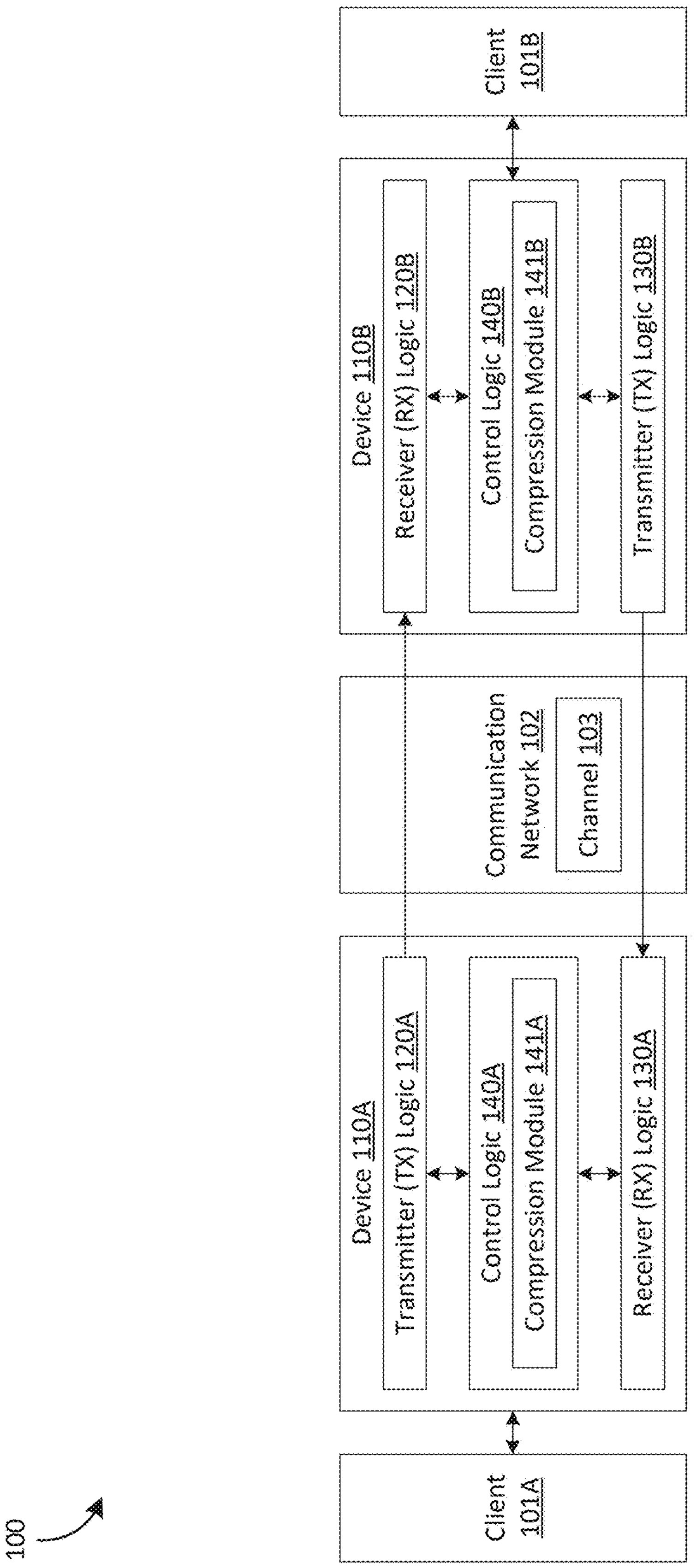
FIG. 1 is a block diagram of an example communication interconnect, according to aspects of the disclosure.

Data can be processed by multiple coupled integrated circuits (ICs) that may each perform different-sometimes specialized-functions. Often these ICs are colloquially referred to as 'chips,' with reference to the final stages of the semiconductor manufacturing process where the ICs (e.g., the chips) are cut from a larger semiconductor wafer. The ICs can be packaged with necessary input/output (I/O) connections, and other circuitry and the resulting apparatus can be referred to as a 'chip.' Thus, a 'communication interconnect' or 'chip-to-chip (C2C) interconnect' can describe an electrical and data coupling (e.g., interconnect) between at least two distinct chips (e.g., ICs). An unpackaged IC that has been cut from a larger semiconductor wafer can be colloquially referred to as a 'die.' Thus, a 'communication interconnect' or 'die-to-die (D2D) interconnect' can describe an electrical and data coupling (e.g., interconnect) between at least two distinct dies (e.g., ICs).

Synchronization in a communication interconnect is achieved by consistently transmitting and receiving frames in both directions at a regular rate (e.g., an active link). Here, a 'frame' refers to a defined package of data with a predetermined size. Often, it is more efficient to maintain an active link between chips rather than pausing and restarting the link based on data availability, and some physical links require an active link to constantly stream.

The integrity of the communication interconnect is upheld by data within each transmitted and received frame. Typically, each frame may contain header information, which may include information about the transmitting device, the link, and other relevant aspects of the interconnect. To ensure data accuracy, frames often carry error-checking data, such as cyclic redundancy check (CRC) data. The CRC data may be used to validate the integrity of the data communicated across the interconnect. In some configurations, the CRC data for an outgoing is generated based on header information from a recently received frame.

In certain configurations, frames are structured into multiple subframes, each of a fixed size. When a subframe is transmitted at a frequency of one per clock cycle, it is referred to as a 'flit.' In these scenarios, the initial flit of a frame typically contains the header information, while the final flit contains the CRC data. Frames carrying are often termed 'client frames' (i.e., of the client frame type). Conversely frames without client data are referred to as non-operational (NOP) frames (i.e., of the NOP frame type).

A sparse communication is a communication which contains portions of non-unique or similar data. For example, a sparse communication may contain one hundred portions with one unique portion and ninety-nine repeated or similar portions. In another example, the 8-letter sequence ABBBBBBB contains one unique value (i.e., the "A") followed by seven repeated values (e.g., the "Bs"). All portions of the sparse communication are transmitted including the non-unique or repeating portions. It can be appreciated that the transmission of the repeated portions of data represent an unnecessary consumption of bandwidth if the transmission could otherwise indicate that the non-unique portion of data is repeated seven times.

Aspects of this disclosure address these and other challenges by implementing compression of sparse communications over a chip-to-chip (C2C) interconnect or a die-to-die (D2D) interconnection. A device can determine that a portion of communication data (e.g., transmission data) matches a certain data pattern. In some embodiments, there are multiple (i.e., repeated) portions of communication data that match the certain data pattern. The device can generate metadata that indicates the certain data pattern that was identified in the communication data, and which portion(s) of the communication data match the certain data pattern. The device can remove the portion(s) of the communication data that match the certain data pattern to generate compressed data. The compressed data can be transmitted along with the generated metadata across the C2C interconnect (e.g., a communication link). The compressed data is received at another device. The receiving device can use the metadata and stored memory of data patterns to decompress the compressed data.

Advantages of the disclosure include, but are not limited to, an increased transmission of unique data across a communication interconnect, effectively increasing the bandwidth of the communication interconnect, especially in workflows that transfer high quantities of repeat data. Additional advantages include an increased power efficiency of data transmissions, improved reliability, and improved handing of data frames.

FIG. 1 is a block diagram of a communication interconnect 100, according to some aspects of the disclosure. The communication interconnect 100 includes a client 101A coupled to a device 110A and a client 101B coupled to a device 110B. The device 110A and the device 110B are coupled together a communication network 102 to transmit and receive data across the channel 103. In some embodiments, the transmitted and received data is included in a data frame. Device 110A includes transmitter logic 120A, receiver logic 130A, and control logic 140A. Device 110B similarly includes transmitter logic 120B, receiver logic 130B, and control logic 140B. While the device 110A is described herein, the functions and operations of the device 110A similarly apply to the functions and operations of the device 110B unless explicitly noted.

In some embodiments, the client 101A is an integrated circuit of a Personal Computer (PC), a laptop, a tablet, a smartphone, a server, a collection of servers, or the like. In some embodiments, the client 101A may correspond to any appropriate type of device that communicates with other devices also connected to a common type of communication network 202.

The device 110A can be an integrated circuit of a graphics processing unit (GPU), a switch (e.g., a high-speed network switch), a network adapter, a central processing unit (CPU), a data processing unit (DPU), a neural processing unit (NPU), an application-specific integrated circuit (ASIC), a field programmable gate array (FPGA), a network interface card (NIC), or the like. The device 110A can be implemented in components in clients referred to as machines, computers, servers, network devices, or the like (e.g., client 101A).

The communication interconnect 100 allows the client 101A to communicate with the client 101B via the channel 103 and devices 110A-110B, respectively. The client 101A can cause the device 110A to transmit and receive data with the client 101B (or another client coupled to the channel 103 via another respective device) via the communication network 102. Similarly, the client 101B can cause the device 110B to transmit and receive data across the communication network 102.

Examples of the communication network 102 that may be used to connect the device 110A and device 110B include wires, conductive traces, bumps, terminals, optical fibers, or the like. In other embodiments, the communication network 102 can be a Peripheral Component Interconnect Express (PCIe) interconnect. PCIe is a high-speed interface standard used to connect various hardware components. It can be an interconnect for devices such as graphics cards (GPUs), solid-state drives (SSDs), network cards, and other peripherals. PCIe offers a scalable, high-speed, and point-to-point connection between devices, including CPUs, GPUs, memory, and the like. In other embodiments, the communication network 102 can be a high-speed interconnect, such as an interconnect that deploys the NVLink technology. The NVLink interconnect can be a GPU-GPU interconnect used between GPUs, a CPU-GPU interconnect between GPUs and CPUs, or an interconnect used between other devices. NVLink offers a higher bandwidth and lower latency than traditional PCIe connections, which are typically used in computing hardware. NVLink is especially useful in scenarios that require massive parallel processing, such as artificial intelligence (AI), machine learning, deep learning, high-performance computing (HPC), and data analytics. For example, in NVIDIA's DGX systems and high-end gaming or AI workstations, NVLink helps GPUs exchange data at speeds that are necessary for demanding tasks like real-time ray tracing or training neural networks. In one specific, but non-limiting example, the communication network 102 is a network that enables data transmission between the device 110A and device 110B using data signals (e.g., digital, optical, wireless signals), clock signals, or both. The embodiments described herein can be utilized in a system with a high-speed, scalable switch, such as a switch using the NVSwitch technology. NVSwitch is a high-speed, scalable switch developed by NVIDIA that facilitates data communication between multiple GPUs in a system, allowing them to work together more efficiently by providing high-bandwidth, low-latency interconnections. The NVSwitch serves as a central hub or high-bandwidth fabric that interconnects all the GPUs in a system, enabling each GPU to communicate with every other GPU quickly and efficiently. The NVSwitch can be coupled between other types of devices, such as CPUs, accelerators, memory, or the like. The NVSwitch can be used for tasks requiring intense computation and collaboration between multiple GPUs, such as AI model training, scientific simulations, and large-scale data processing. The embodiments described herein can be used in a high-performance computing system, such as a computing system modeled after NVIDIA's DGX systems, which are designed specifically for artificial intelligence (AI), deep learning, and high-performance computing (HPC) workloads. DGX systems are optimized for large-scale GPU computation and parallel processing, integrating multiple GPUs, high-bandwidth interconnects, and software frameworks tailored for AI and HPC tasks. In at least one embodiment, a system for high-speed network communication includes a processing unit, a network interface comprising a receiver or transceiver with the control logic 140A, as described herein.

Other examples for the communication network 102 can include other chip-to-chip or die-to-die interconnects, such as GRS, LPI (low power interface) or LLI (low latency interface).

In embodiments, the device 110A can interface with the client 101A to transmit and receive data over a two-way communication stream (e.g., channel 103 of the communication network 102). The channel 103 can be PCIe, NVLink, Ethernet, InfiniBand, Ground Reference Signal (GRS), C2C, D2D, or the like. As illustrated, device 110A is single device which includes transmitter logic 120A and receiver logic 130A (and device 110B respectively includes the transmitter logic 120B and receiver logic 130B). In some embodiments, the device 110A can include a transceiver device, transmitter device, or receiver device, which may include some or all of the transmitter logic 120A and/or receiver logic 130A.

The device 110A can include transmitter logic 120A to send data signals and receiver logic 130A to receive data signals. In some embodiments, a transmitter or transceiver of the device 110A may include some or all of the transmitter logic 120A (e.g., a transmitter device or a transceiver device). In some embodiments, a receiver or transceiver of the device 110A may include some or all of the receiver logic 130A (e.g., a receiver device or a transceiver device).

The transmitter logic 120A includes suitable software, firmware, and/or hardware for receiving digital data from a source (e.g., client 101A) and outputting data signals according to the digital data for transmission over the communication network 102. In some embodiments, the transmitter logic 120A can generate and transmit frames including data from the client 101A over the communication network 102 to the device 110B. For example, the transmitter logic 120A can generate and transmit frames across the channel 103 to the device 110B.

The receiver logic 130A includes suitable software, firmware, and/or hardware for receiving digital data from a device over the communication network 102 and outputting digital data for further processing by a recipient (e.g., client 101A). For example, the receiver logic 130A may include components for receiving processing signals to extract the data for storing in a memory. In some embodiments, the receiver logic 130A can receive and process frames including data from the client 101A over the communication network 102 from another device 110B. For example, the receiver logic 130B can receive and process frames including data from the client 101A across the channel 103 from the device 110B. The receiver logic 130A receives an incoming signal and samples the incoming signal to generate samples, such as using an analog-to-digital converter (ADC). The ADC can be controlled by a clock-recovery circuit (or clock recovery block) in a closed-loop tracking scheme. The clock-recovery circuit can include a controlled oscillator, such as a voltage-controlled oscillator (VCO) or a digitally-controlled oscillator (DCO) that controls the sampling of the subsequent data by the ADC.

In some embodiments, the transmitter logic 120A and receiver logic 130A can include multiple processing elements, such as one or more of transaction layer logic, datalink layer logic, or physical layer logic. The transmitter logic 120A and/or the receiver logic 130A or selected elements of the device 110A may take the form of a pluggable card or respective controller for the device 110A. For example, the transmitter logic 120A and the receiver logic 130A or selected elements of the device 110A may be implemented on a network interface card (NIC).

Additional details regarding the device 110A, including details regarding the transmitter logic 120A and the receiver logic 130A, are described below with reference to FIG. 2.

The device 110A can include control logic 140A. The control logic 140A can cause the device 110A to perform one or more functions, such as transmitting and receiving data signals over the communication network 102. In some embodiments, the control logic 140A causes the transmitter logic 120A of the device 110A to transmit a data signal over the communication network 102. In some embodiments, the control logic 140A causes the receiver logic 130A of the device 110A to receive a data signal over the communication network 102.

The control logic 140A may comprise software, hardware, or a combination thereof. For example, the control logic 140A may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the control logic 140A may comprise hardware, such as an Application-Specific Integrated circuit (ASIC). Other non-limiting examples of the control logic 140A include an Integrated Circuit (IC) chip, a CPU, A GPU, a DPU, a microprocessor, a Field-Programmable Gate Array (FPGA), a collection of logic gates or transistors, resistors, capacitors, inductors, diodes, or the like. Some or all of the control logic 140A may be provided on a Printed Circuit Board (PCB) or collection of PCBs. It should be appreciated that any appropriate type of electrical component or collection of electrical components may be suitable for inclusion in the control logic 140A. The control logic 140A may send and/or receive signals to and/or from other elements of the device 110A to control the overall operation of the device 110A.

In embodiments, the control logic 140A can include a compression module 141A. The compression module 141A can perform a compression operation on transmission data to generate compressed transmission data that is sent across the channel 103. The compression module 141A can also receive compressed transmission data and perform a decompression operation on the compressed transmission data to generate decompressed transmission data that can be provided to the client 101A. In some embodiments, the compression module 141A can include or be associated with a data store that contains multiple data patterns. In some embodiments, the compression module 141A can include processing circuitry or hardware used to perform operations of the compression module 141A (e.g., compression operations or decompression operations). Performing the compression or decompression operation at the compression module 141A (or compression module 141B) can include one or more of identifying the data pattern, removing the portions of the transmission data that match the data pattern, generating metadata to represent what portions of the transmission data were removed, or the like. In alternative embodiments, the compression module 141A includes instructions to be performed by another element of the device 110A, such as the transmitter logic 120A or the receiver logic 130A. Additional details regarding the compression module 141A are described below with reference to FIG. 2.

Figure 2:
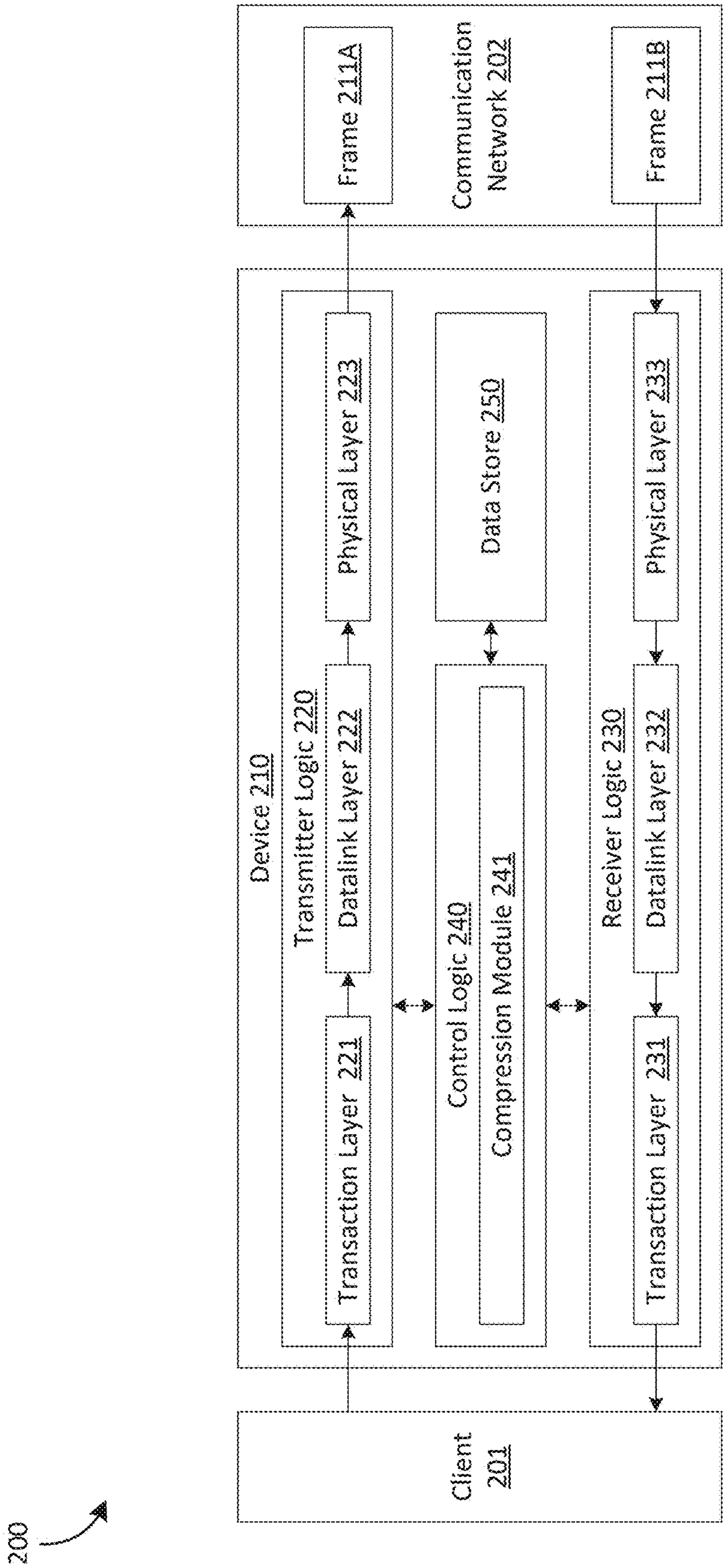
FIG. 2 is a block diagram of a communication device in a communication interconnect, according to some aspects of the disclosure.

FIG. 2 is a block diagram of a communication device in a communication interconnect 200, according to some aspects of the disclosure. The communication interconnect 200 includes a client 201 coupled to a device 210 (e.g., the communication device), which transmits (e.g., frame 211A)

and receives (e.g., frame 211B) data over the communication network 202. The device 210 can be the same as or similar to the device 110A described with respect to FIG. 1. Similarly, the client 201 and communication network 202 and other elements of FIG. 2 can be the same as or similar to the client 101A, channel 103, and other elements of FIG. 1, respectively.

The device 210 can include transmitter logic 220, receiver logic 230, control logic 240, and a data store 250. The transmitter logic can include a transaction layer 221, a datalink layer 222, and a physical layer 223. The receiver logic 230 can similarly include a transaction layer 231, a datalink layer 232, and a physical layer 233. The control logic 240 can include a compression module 241. The data store 250 can be coupled to the control logic 240, and accessed by the compression module 241. In some embodiments, the data store 250 may be accessed by elements of the transmitter logic 220 and/or elements of the receiver logic 230. In alternative embodiments, the control logic 240 accesses the data store 250 and provides information or data from the data store 250 to one or more of the transmitter logic 220 or receiver logic 230 as necessary.

The transaction layer 221 of the transmitter logic 220 can interface directly with the client 201. The transaction layer 221 can receive data from the client 201 (e.g., "client data") that is to be transmitted across the communication network 202. In some embodiments, the transaction layer 221 can divide the data received from the client 201 into smaller data quantities. For example, the transaction layer 221 can receive several kilobytes of data from the client 201. The transaction layer may break the received data down into evenly sized data quantities of one byte each. Additional data quantities are also considered, and one byte is used here only illustratively.

Similarly, the transaction layer 231 of the receiver logic 230 interfaces directly with the client 201. The transaction layer 231 provides data received in the frame 211B to the client 201. The frame 211B can be processed by elements of the receiver logic 230 (e.g., the datalink layer 232 and physical layer 233) prior to the data of the frame 211B being provided to the transaction layer 231. In some embodiments, the transaction layer 231 assembles multiple frames (e.g., 211B) into predetermined quantities of data that are provided to the client 201.

The datalink layer 222 of the transmitter logic 220 can receive a data quantity from the transaction layer 221. The data quantity can be packaged into a frame (e.g., frame 211A) by the datalink layer 222 for transmission across the communication network 202. In some embodiments, a frame corresponds to the quantity of data (e.g., one frame contains one byte of data, another frame contains another byte of data). In some embodiments, frame 211A includes metadata along with the client data. The metadata can include information about the data, such as encryption data, compression data, link data, error-check data, or the like.

Similarly, the datalink layer 232 of the receiver logic 230 can process the frame 211B received at the device 210 via the physical layer 233 of the receiver logic. The datalink layer 232 can extract data from the frame 211B and provide the extracted data to the transaction layer 231 of the receiver logic 230. In some embodiments, the datalink layer 232 can extract the data based on metadata that is received along with the received data. In some embodiments, the metadata is provided along with the received data to the transaction layer 231. In alternative embodiments, once the received data is extracted from the frame 211B, the corresponding metadata is discarded.

The physical layer 223 of the transmitter logic 220 interfaces with the communication network 202 to transmit the frame 211A across the communication network 202. The physical layer 223 can include circuitry and/or other elements that enable the transmitter logic 220 to transmit the frame 211A across the communication network 202. In some embodiments, the physical layer includes physical ports for coupling to the communication network 202 and/or circuitry to interface with the physical ports.

Similarly, the physical layer 233 of the receiver logic 230 interfaces with the communication network 202 to receive the frame 211B from the communication network 202.

The control logic 240 includes a compression module 241. In some embodiments, the compression module 241 can be the same as or similar to the compression module 141A described with reference to FIG. 1. The control logic 240 can be implemented by any combination of one or more of hardware, firmware, or software, such as in a controller.

The compression module 241 can identify data portions of the transmission data that match data patterns. In some embodiments, the data patterns can be stored in the compression module 241 or in a memory coupled to the compression module 241, such as the data store 250. In some embodiments, the compression module 241 can identify data portions that match two or more data patterns. That is, a number of data portions may match one data pattern, and another number of data portions may match another data pattern. In some embodiments, the compression module 241 generates an indication of a data pattern that is most prevalent in the transmission data. That is, the data pattern that matches the highest number of data portions of the transmission data.

The compression module 241 can remove the data portions matching data patterns from the transmission data. In some embodiments, the compression module 241 can remove data portions matching multiple data patterns from the transmission data. In some embodiments, the compression module 241 causes the transmitter logic 220 to remove the data portions matching the data patterns from the transmission data. For example, the compression module can cause one or more of the transaction layer 221 or the datalink layer 222 to remove the data portions matching the data patterns from the transmission data. In some embodiments, the data portions matching the data pattern are removed at the datalink layer 222 during frame generation. In an alternative embodiment, the data portions matching a data pattern are removed prior to the frame generation performed at the datalink layer 222. In some embodiments, data portions matching multiple data patterns can be removed from the transmission data. For example, data portions matching one data pattern and data portions matching another data pattern can be removed from the transmission data. Removing data portions from the transmission data causes the compression module 241 to generate (or "obtain") compressed transmission data, or compressed data. Additional details regarding removing data portions from the transmission data are described below with reference to FIGS. 3A-3B.

The compression module 241 can generate metadata to indicate which data portion(s) were removed from the transmission data. In some embodiments, the generated metadata can indicate a sequence, order, or index corresponding to the removed data portion. For example, if the transmission data contains eight data portions and the fifth data portion is removed, the generated metadata can indicate that the fifth data portion was removed. The metadata can also include information regarding the data pattern matching the removed data portion. For example, if the fifth data portion matched a particular data pattern stored in a data store, the respective index of the particular data pattern can be represented in the generated metadata. In embodiments where data portions matching multiple data patterns are removed from the transmission data, the index of the removed data portion and corresponding data pattern can be included in the metadata for each index of a removed data portion. Additional details regarding the metadata generated by the compression module 241 are described below with reference to FIGS. 3A-4B.

In some embodiments, the compression module 241 can determine whether performing a compression operation to remove data portions from the transmission data and generate corresponding metadata satisfies a threshold condition. In some embodiments, the threshold condition can be based on one or more of an amount of energy to perform the compression operation, a processing duration to perform the compression operation, a size of the metadata combined with the transmission data sans the removed data portions in comparison to the full transmission data, or the like. For example, in some instances it may be less energy efficient to perform the compression operation, even if the resulting data (e.g., transmission data and metadata) have a smaller size compared to the full transmission data. In another example, in some instances the processing time to perform the compression operation may cause a performance bottleneck, or the like that would not occur if the full transmission data was transferred. In another example, in some instances a size of the generated metadata may meet or exceed a size of the removed data portions from the transmission data, representing the same, or worse performance (e.g., data throughput performance) in comparison to transmitting the full transmission data. In some embodiments, the compression module 241 can determine whether performing the compression operation will satisfy the threshold condition prior to performing the compression operation. In alternative embodiments, the compression module 241 can determine whether to send the compressed transmission data and corresponding metadata or the full transmission data (e.g., the decompressed transmission data) after performing the compression operation, based on the generated compressed transmission data and corresponding metadata.

In some embodiments, the compression module 241 is configurable. That is, the known data patterns, selection of data portions matching known data patterns to be removed, generation of metadata, and the like, can be changed based on operating conditions of the device 210, either during manufacturing or operation of the device 210.

The data store 250 can store information for performing the operations of one or more of the transmitter logic 220, the receiver logic 230, or the control logic 240. For example, and in some embodiments, the data store 250 can store an index of data patterns. The index of a data pattern that matches data portions removed from transmission data can be included in the metadata generated for the compressed transmission data (e.g., the transmission data after data portions matching the data pattern have been removed).

Figure 3A:
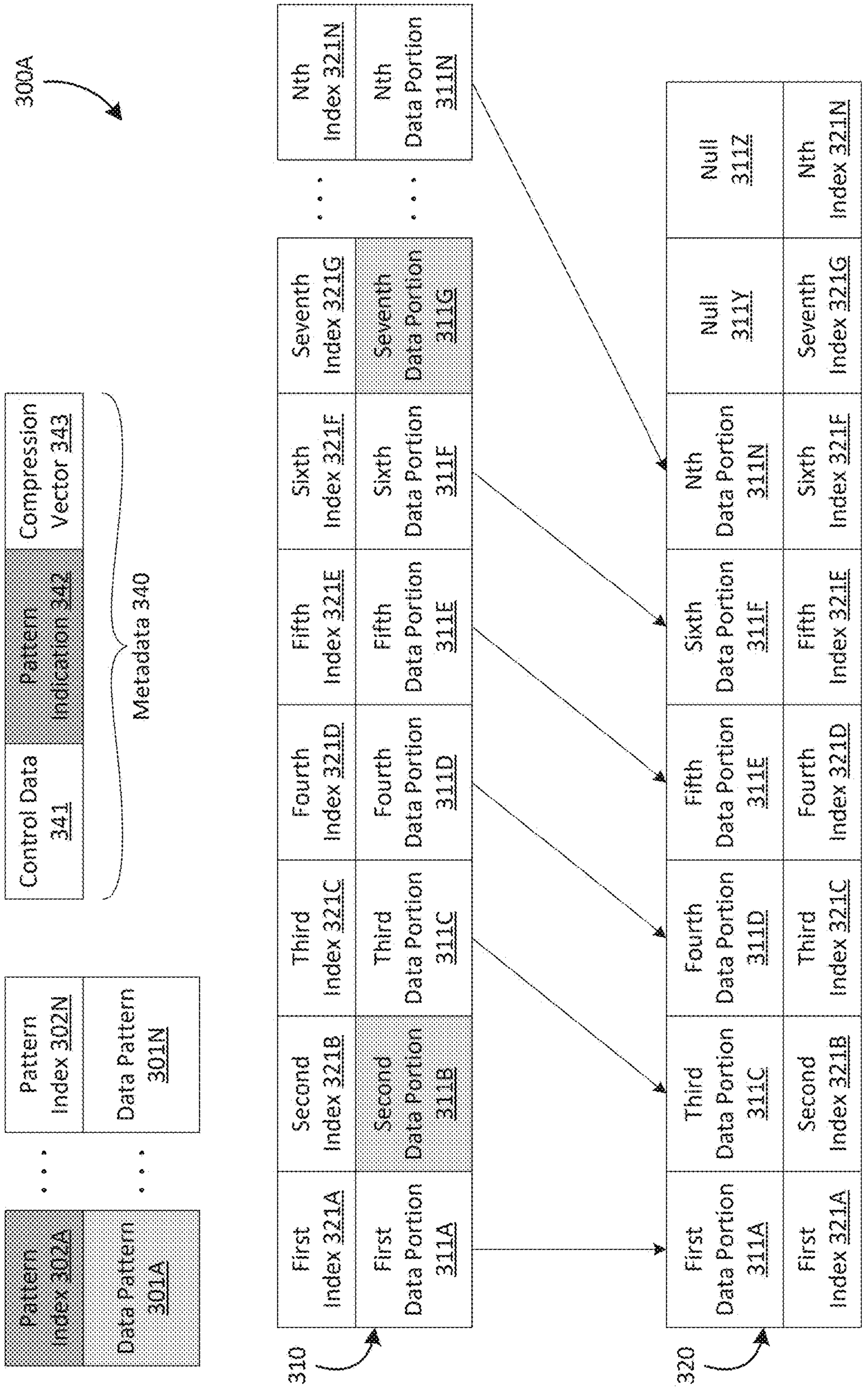
FIG. 3A is a block diagram illustrating a compression operation to convert transmission data into compressed transmission data and generate the metadata, according to some aspects of the disclosure.

FIG. 3A is a block diagram illustrating a compression operation 300A to convert transmission data 310 into compressed transmission data 320 and generate the metadata 340, according to some aspects of the disclosure. The compression operation 300A is performed based on data patterns 301A through data patterns 301N that are stored in a memory respectively at pattern index 302A through pattern index 302N. While FIG. 3A illustrates multiple data patterns, in alternative embodiments a dedicated data pattern (or two dedicated data patterns) may be used. Additionally, while the data patterns are described in FIG. 3A as being stored in a memory, in alternative embodiments, the data patterns may alternatively be stored in hardware circuitry or in a read-only-memory (ROM), for example.

The transmission data 310 illustrated here includes first data portion 311A, second data portion 311B, third data portion 311C, fourth data portion 311D, fifth data portion 311E, sixth data portion 311F, seventh data portion 311G, and Nth data portion 311N, each corresponding to a portion of the transmission data 310. Each of the data portions is stored at a respective data index, illustrated here as first index 321A, second index 321B, third index 321C, fourth index 321D, fifth index 321E, sixth index 321F, seventh index 321G, and Nth index 321N. It can be appreciated that the eight data portions and corresponding indices illustrated in the FIG. 3A are merely exemplary and larger or smaller sizes of transmission data are also considered.

During the compression operation 300A, processing logic (such as the compression module 141A of FIG. 1 or the compression module 241 of FIG. 2, or the like) determines whether any of the portions of the transmission data (e.g., first data portion 311A, second data portion 311B, etc.) match a data pattern (e.g., data pattern 301A, data pattern 301N, etc.). In some embodiments, the processing logic can read each data portion of the transmission data 310 to verify which data portion(s) match a particular data pattern. In some embodiments, each portion of the transmission data 310 can be compared to respective data patterns using hardware circuitry such as adders, shift registers, or the like or using bitwise logical operations such as AND, OR, NOT, exclusive-OR (XOR) operations, or the like. If the processing logic determines that there are no data portions that match data pattern(s), or determines that there are an insufficient number of data portions that match data pattern(s), the transmission data 310 can be transmitted without compression. If the processing logic determines that there are data portions (or a sufficient number of data portions) that match data pattern(s), the processing logic can convert the transmission data 310 to compressed transmission data 320 during the compression operation 300A.

During the compression operation 300A, and to generate the compressed transmission data 320, the processing logic removes data portions of the transmission data 310 that match a data pattern. In the illustrative FIG. 3A, the processing logic determines that the second data portion 311B and the seventh data portion 311G match the data pattern 301A. These data portions are removed from the transmission data 310, and remaining data portions are shifted to fill in the gaps left by the data portion removal. The result is illustratively the compressed transmission data 320, which does not include a representation of second data portion 311B or a representation of seventh data portion 311G.

The compressed transmission data 320 illustrated here includes first data portion 311A, third data portion 311C, fourth data portion 311D, fifth data portion 311E, sixth data portion 311F, and Nth data portion 311N, each corresponding to a portion of the compressed transmission data 320. Each numbered data portion of the compressed transmission data 320 is a representation of correspondingly labeled data portions of the transmission data 310. The compressed transmission data 320 also illustrates null 311Y and null 311Z. These fields are null (e.g., there is no data stored) with respect to the compressed transmission data 320. However, when the compressed transmission data is transmitted, the null data spaces are not transmitted, but are instead filled with metadata for the compressed transmission data, or data of subsequent transmissions or compressed transmissions.

Each of the data portions is stored in a particular sequence illustrated here as first index 321A, second index 321B, third index 321C, fourth index 321D, fifth index 321E, sixth index 321F, seventh index 321G, and Nth index 321N. Here, the seventh index 321G and the Nth index 321N contain null 311Y and Null 311Z respectively. As described above, these indices are with respect to the transmission data 310 and compressed transmission data 320, and are not necessarily relevant with respect to a subsequent transmission or compressed transmission. However, the total number of indices for the transmission data 310 is relevant. The compressed transmission data 320 will be decompressed to fill the same number of indices as the transmission data 310 prior to the compression operation 300A.

As part of the compression operation 300A, the processing logic generates metadata 340. The metadata 340 includes control data 341, a pattern indication 342, and a compression vector 343.

The control data 341 can indicate that associated data is compressed. That is, for metadata 340 transmitted with compressed transmission data 320, the control data 341 can indicate that the compressed transmission data 320 is compressed. In some embodiments, the control data 341 can indicate a type of the compression operation performed on the compressed transmission data 320. For example, in one type of compression operation, data portions matching a single data pattern can be removed from the transmission data 310 (as illustrated here), while in another type of compression operation data portions matching multiple data patterns can be removed from the transmission data 310. In some embodiments, the control data 341 indicates a size of the compression vector 343 in the metadata 340.

The pattern indication 342 can represent the data pattern (e.g., data pattern 301A in the illustrative FIG. 3A) that was removed from the transmission data 310 to generate the compressed transmission data 320. In some embodiments, the pattern indication 342 corresponds to an index of a table storing the data pattern 301A through data pattern 301 N (e.g., as pattern index 302A through pattern index 302N, respectively). In alternative embodiments, the pattern indication 342 can be the data pattern 301A that was removed from the transmission data 310. For example, seven of the eight portions of the transmission data 310 matched a particular data pattern, but the particular data pattern was not one of data pattern 301A through data pattern 301N, the pattern indication 342 could include the full data pattern of the seven portions that were removed. Since seven portions were removed, the inclusion of the full data pattern as the pattern indication 342 can still result in a significant compression of the transmission data 310 into the compressed transmission data 320. In embodiments where the pattern indication 342 is the full data pattern, the control data 341 can indicate that the pattern indication 342 includes a longer string of bits than if the pattern indication 342 were representing, for example, the pattern index 302A corresponding to the data pattern 301A.

The compression vector 343 represents an indication of the indices of the transmission data 310 where a data portion was removed. The compression vector 343 can have one value representing each index of the transmission data 310. Where data portions are removed, the corresponding value in the compression vector 343 can be changed from a default value. For example, a compression vector generated for the transmission data 310 may be <0, 1, 0, 0, 0, 0, 1, 0>, where "0" represents the data portion was not removed, and "1" represents that the data portion was removed. Additional details regarding the compression vector 343 are described below with reference to FIGS. 4A-4B.

Figure 3B:
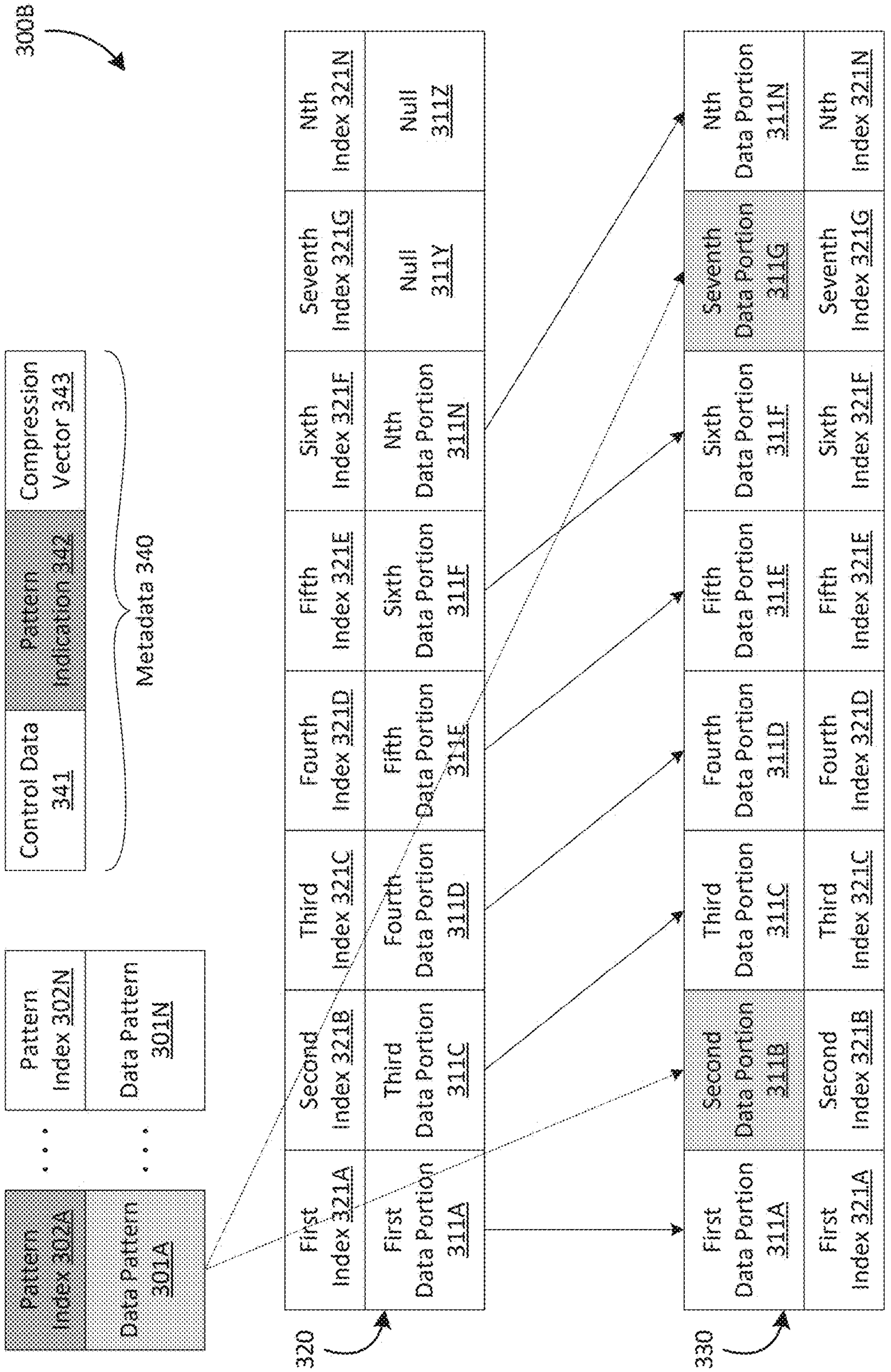
FIG. 3B is a block diagram illustrating a decompression operation to convert compressed transmission data into decompressed transmission data based on the metadata 340, according to some aspects of the disclosure.

FIG. 3B is a block diagram illustrating a decompression operation 300B to convert compressed transmission data 320 into decompressed transmission data 330 based on the metadata 340, according to some aspects of the disclosure. The compressed transmission data 320 illustrated here can be the same as the compressed transmission data of FIG. 3A.

During the decompression operation 300B, processing logic (such as the compression module 141A of FIG. 1 or the compression module 241 of FIG. 2, or the like) uses the metadata 340 and the compressed transmission data 320 to generate the decompressed transmission data 330. The processing logic receiving the compressed transmission data 320 determines that the compressed transmission data 320 is compressed based on the control data 341. The processing logic uses the pattern indication 342 and the compression vector 343 to re-insert the data pattern 301A into the applicable indices of the compressed transmission data 320 to generate the decompressed transmission data 330. The decompressed transmission data 330 can be further processed by the receiving device (e.g., device 110B of FIG. 1) and may be provided, for example to a client (e.g., client 101B of FIG. 1).

During the decompression operation 300B in the illustrative FIG. 3B, the compressed transmission data 320 is converted to the decompressed transmission data 330, as follows: the first data portion 311A remains in the first index 321A, the second data portion 311B is re-inserted at the second index 321B, the third data portion 311C is shifted back to the third index 321C, the fourth data portion 311D is shifted back to the fourth index 321D, the fifth data portion 311E is shifted back to the fifth index 321E, the sixth data portion 311F is shifted back to the sixth index 321F, the seventh data portion 311G is re-inserted at the seventh index 321G, and the Nth data portion 311N is shifted back to the Nth index 321N.

Figure 4A:
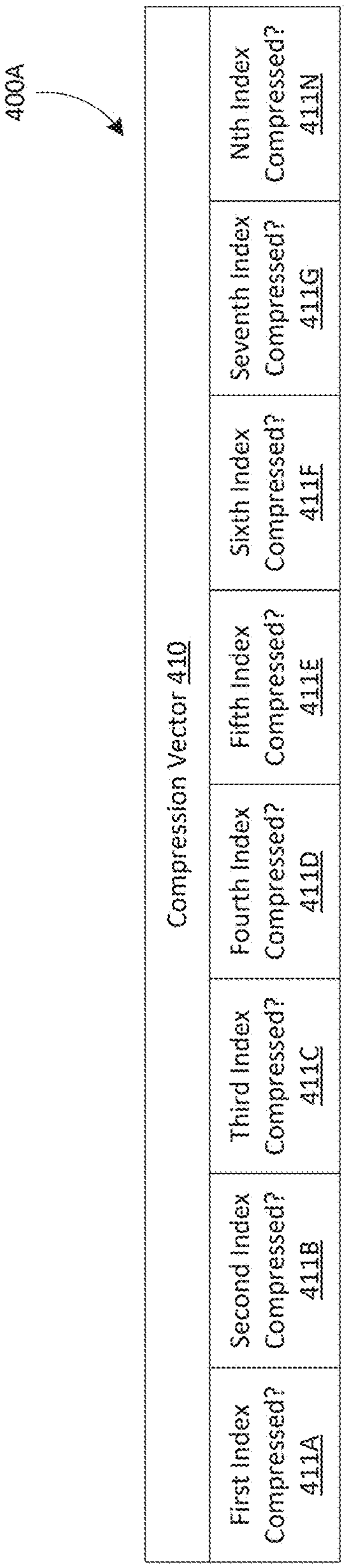
FIG. 4A is a block diagram illustrating a compression vector, according to some aspects of the disclosure.

FIG. 4A is a block diagram 400A illustrating a compression vector 410, according to some aspects of the disclosure. The compression vector 410 can be the same as or similar to the compression vector 343 described above with reference to FIG. 3.

As illustrated, the compression vector 410 includes N-number of entries corresponding to a number of data portions in transmission data (as determined for a particular device, set of devices, communication type, or the like), represented here as first index compressed 411A, second index compressed 411B, third index compressed 411C, fourth index compressed 411D, fifth index compressed 411E, sixth index compressed 411F, seventh index compressed 411G, and Nth index compressed 411N. For the compressed transmission data 320 of FIG. 3A-3B, the all entries in the compression vector 410 would be the default value, indicating that data is not removed, except the second index compressed 411B and the seventh index compressed 411G which would be the non-default value. In some embodiments, the default value is "0," while the non-default value is "1." In alternative embodiments, the default value is "1," while the non-default value is "0." Importantly, there is a default value for the values of the compression vector, and a non-default value which indicates that a data portion was removed from transmission data at the index having the non-default value. For example, the compression vector 410 for the compressed transmission data 320 of FIG. 3A-3B written in vector form could be <0, 1, 0, 0, 0, 0, 1, 0>, where "0" is the default value and "1" is the non-default value.

In some embodiments, the values stored at each index of the compression vector 410 are single bit values (shown above). In alternative embodiments, the values stored at each index of the compression vector 410 can be multi-bit values. A non-default multibit value at a certain index in the compression vector 410 can indicate that a data portion was removed at that index, and may indicate which data pattern was removed. For example, data patterns may be stored and indexed as "01" through "11" (e.g., index one through index three in binary). Thus, a compression vector 410 <00, 01, 00, 10, 00, 00, 11, 00> can indicate that a data portion matching the first data pattern was removed from the second index of the transmission data, a data portion matching the second pattern was removed from the fourth index of the transmission data, and a data portion matching the third pattern was removed from the seventh index of the transmission data.

Figure 4B:
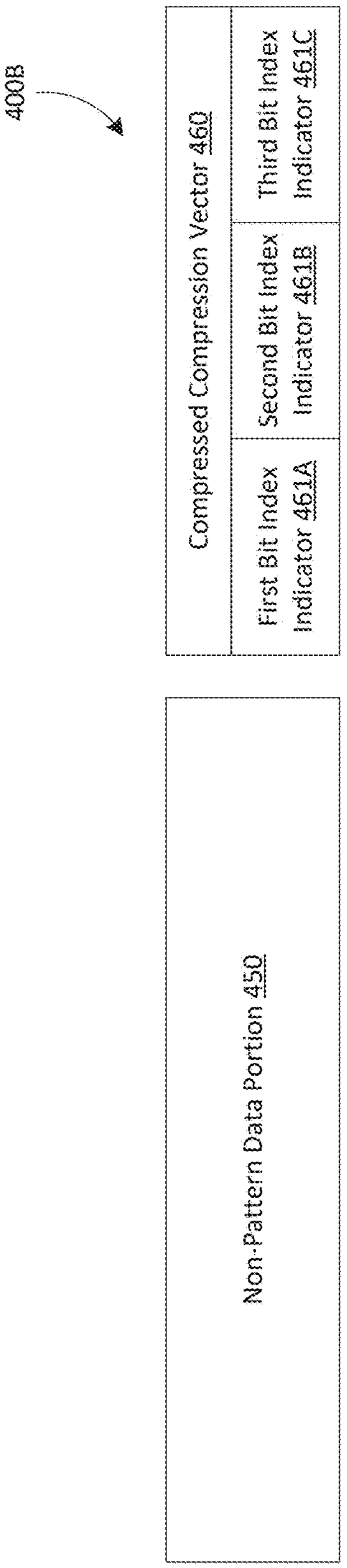
FIG. 4B is a block diagram illustrating non-pattern data portion of transmission data corresponding to a compressed compression vector, according to some aspects of the disclosure.

FIG. 4B is a block diagram 400B illustrating a non-pattern data portion 450 of transmission data (e.g., transmission data 310 of FIG. 3) corresponding to a compressed compression vector 460, according to some aspects of the disclosure.

Transmission data may have a large quantity of data portions that match a data pattern. In such instances, it may be more effective to transfer the unique data that does not match a data pattern along with metadata indicating an index in the transmission data associated with the the unique data, instead of transmitting indications of the non-unique data (e.g., data portions matching data pattern(s)). Each non-pattern data portion 450 can be transmitted along with corresponding metadata (e.g., metadata 340 of FIG. 3A-3B) which includes the compressed compression vector 460. The compressed compression vector 460 is a set of bits corresponding to a number of indexed locations of the transmission data. Illustratively, the compressed compression vector 460 has a first bit index indicator 461A, a second bit index indicator 461B, and a third bit index indicator 461C, which is enough to represent eight index locations for data portions in the transmission data.

For example, the index of the non-pattern data portion 450 can be represented by the compressed compression vector 460. So, if the non-pattern data portion 450 is removed from a fifth index (e.g., fifth index 321E of FIG. 3A) the compressed compression vector 460 (illustratively having a enough bits to represent eight index locations) could be represented in vector notation as <1, 0, 0>, which evaluates as four in base-ten, but represents the fifth number (including zero) in the possible combination of three bits. The non-pattern data portion 450 can be transmitted with the compressed compression vector 460 and a receiving device can generate decompressed transmission data based on the non-pattern data portion 450, the compressed compression vector 460, and accompanying metadata indicating the data pattern that was removed from the remaining portions of the transmission data.

Non-pattern data portion 450 represents a portion of transmission data (e.g., transmission data 310 of FIG. 3).

Figure 5:
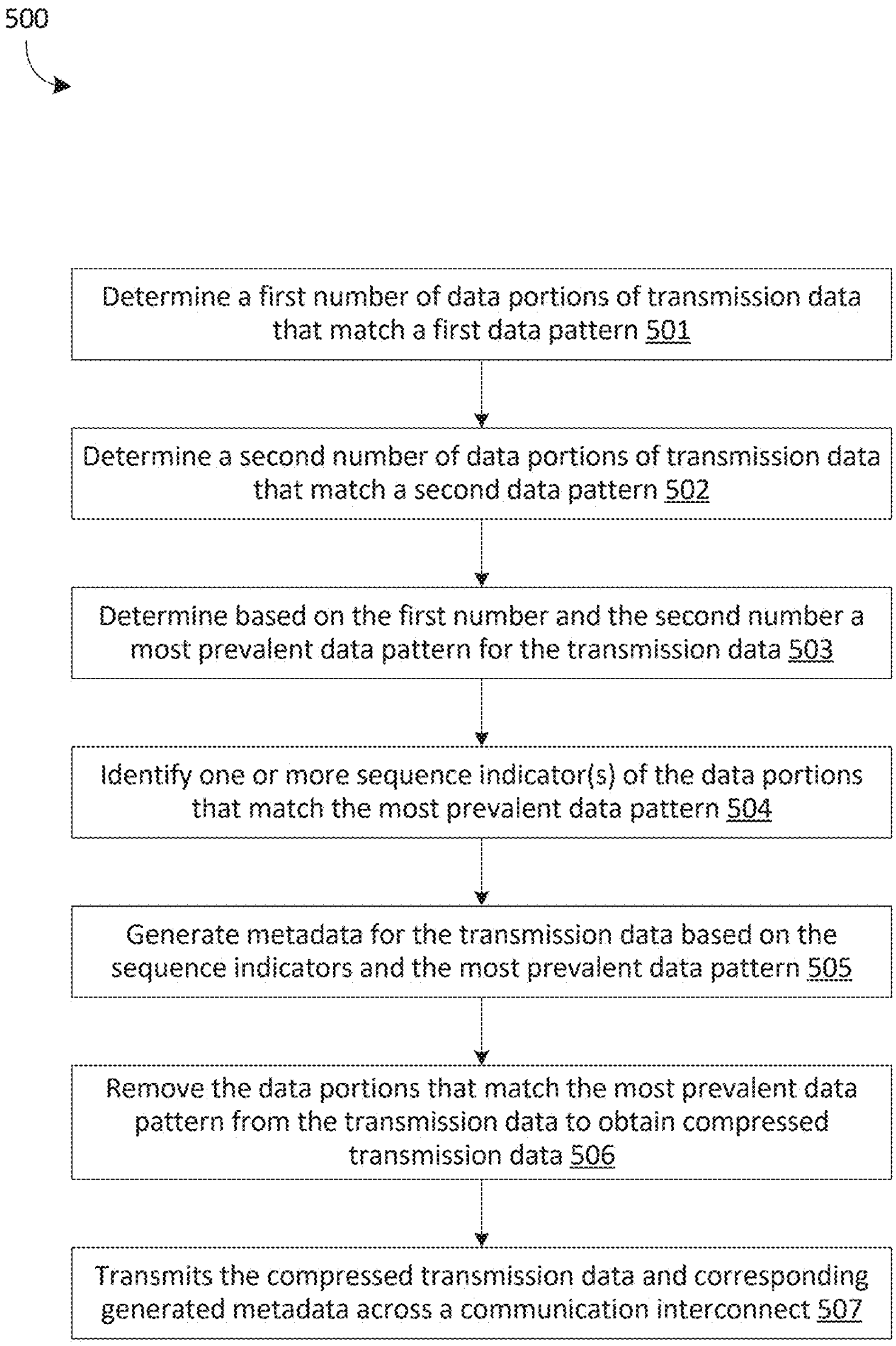
FIG. 5 is a flow diagram of an example method for compression of sparse communications over a C2C interconnect, according to some aspects of the disclosure.

FIG. 5 is a flow diagram of an example method 500 for compression of sparse communications over a C2C interconnect, according to aspects of the disclosure. The method 500 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the control logic 140A or the compression module 141A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 501, control logic performing the method 500 determines a number of data portions that match a first data pattern.

At operation 502, the control logic determines a number of data portions that match a second data pattern.

At operation 503, the control logic determines based on the first number and the second number, a most prevalent data pattern for the transmission data. The most prevalent data pattern can be the data pattern that has a greater number of matching data portions in the transmission data. In some embodiments, if a number of matching data portions for a particular data pattern is greater than or equal to a number of matching data portions for another data pattern, the particular data pattern is the most prevalent data pattern. In some embodiments, if the respective number of matching data portions for two or more data patterns is the same, the most prevalent data pattern can be determined by one or more of random selection, the first-in-time identified data pattern, an index associated with each data pattern, a predetermined preference for a particular data pattern, or the like.

At operation 504, the control logic identifies one or more sequence indicators of the data portions that match the most prevalent data pattern.

At operation 505, the control logic generates metadata for the transmission data based on the sequence indicators and the most prevalent data pattern.

At operation 506, the control logic removes the data portions that match the most prevalent data pattern from the transmission data to obtain compressed transmission data.

At operation 507, the control logic transmits the compressed transmission data and corresponding generated metadata across a communication interconnect.

Figure 6:
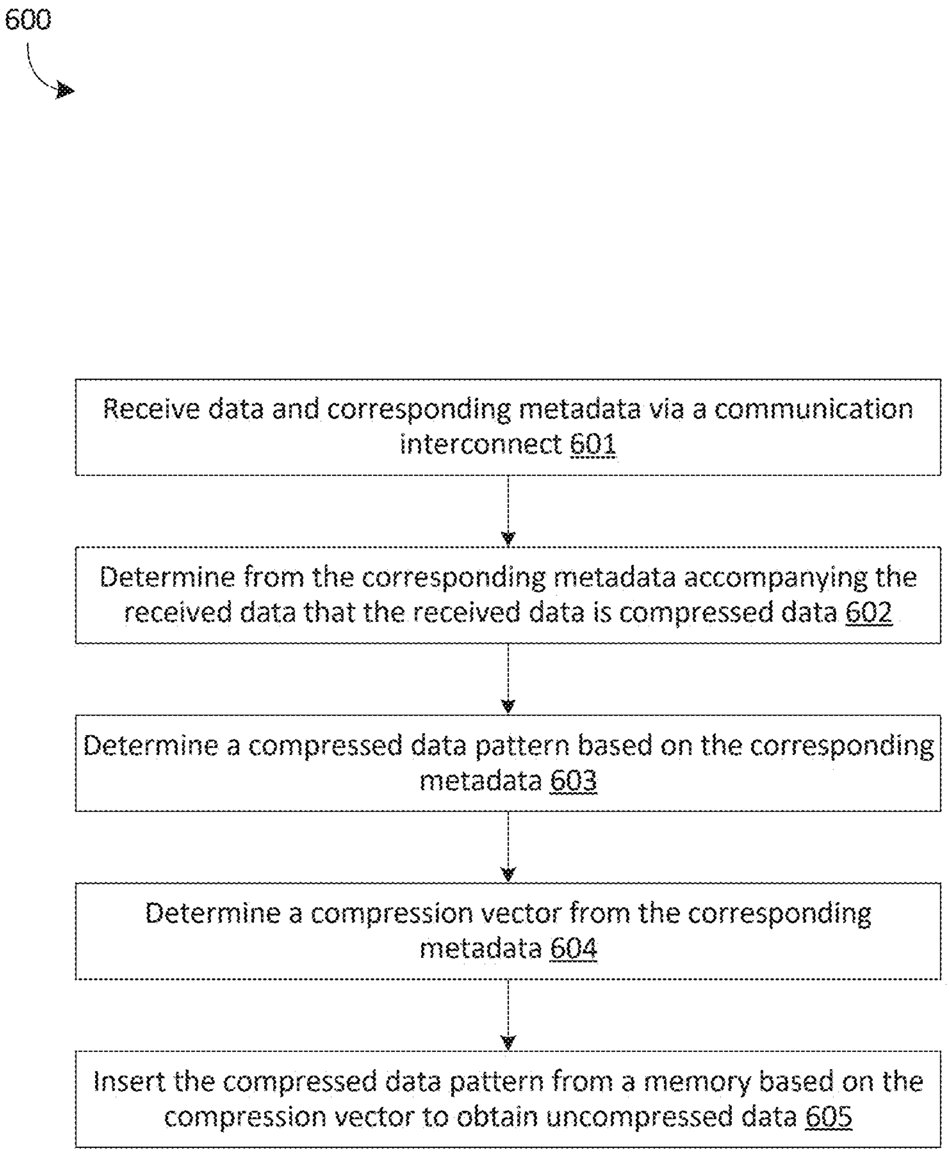
FIG. 6 is a flow diagram of an example method for compression of sparse communications over a C2C interconnect, according to some aspects of the disclosure.

FIG. 6 is a flow diagram of an example method 600 for compression of sparse communications over a C2C interconnect, according to aspects of the disclosure. The method 600 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the control logic 140A or the compression module 141A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 601, control logic performing the method 600 receives data via a communication interconnect. In some embodiments, the received data is packaged in a frame, or similar.

At operation 602, the control logic determines from the corresponding metadata accompanying the received data that the received data is compressed data.

At operation 603, the control logic determines a compressed data pattern based on the corresponding metadata.

At operation 604, the control logic determines a compression vector from the corresponding metadata.

At operation 605, the control logic inserts the compressed data pattern from a memory based on the compressed vector to obtain decompressed data.

Figure 7:
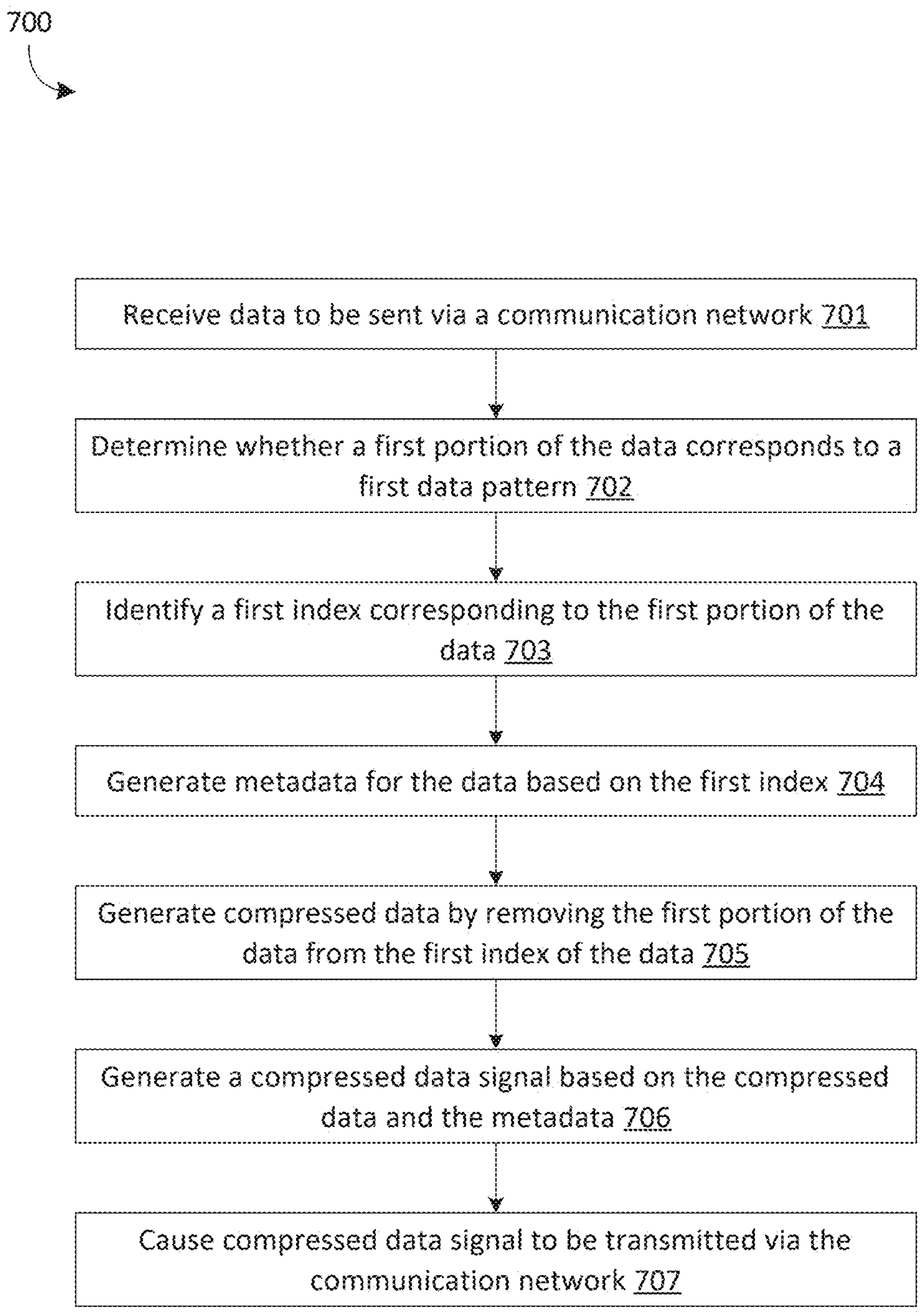
FIG. 7 is a flow diagram of an example method for compression of sparse communications over a C2C interconnect, according to some aspects of the disclosure.

FIG. 7 is a flow diagram of an example method 700 for compression of sparse communications over a C2C interconnect, according to aspects of the disclosure. The method 700 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the control logic 140A or the compression module 141A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 701, control logic performing the method 700 receives data to be sent via a communication network.

At operation 702, the control logic determines whether a first portion of the data matches a first data pattern. In some embodiments, the control logic determines whether additional portions of the data match the first data pattern. In some embodiments, the control logic determines whether a second portion of the data (or multiple portions of the data) matches a second data pattern. In some embodiments, responsive to determining a second portion of the data matches a second data pattern, the control logic determines which data pattern matches more portions of the data.

At operation 703, the control logic identifies a first index corresponding to the first portion of the data. In embodiments where multiple portions are identified as matching the first data pattern, the control logic determines respective indices for each matching portion of the data. In embodiments where a second portion is identified as matching a second data portion, the control logic determines a second index for the second portion.

At operation 704, the control logic generates metadata for the data based on the first index. In some embodiments, the control logic generates the metadata based on the first index and the first data pattern. In embodiments where a second portion of the data matches a second data pattern, the control logic can generate the metadata based on the first index corresponding to the first data pattern and the second index corresponding to the second data pattern.

At operation 705, the control logic generates compressed data by removing the first portion of the data from the first index of the data. In some embodiments, to remove the first portion of the data from the first index, the control logic shifts a second portion of the data from a second index to the first index. In some embodiments, the control logic generates compressed data by removing respective portions of the data that match the first data pattern at respective indices of the data. In embodiments where a second portion of the data matches a second data pattern, the control logic can generate the compressed data by removing the second portion of the data at the corresponding second index. In some embodiments, the control logic can shift a third portion of the data from a third index of the data to the first index and shift a fourth portion of the data from a fourth index of the data to the second index.

In embodiments where the control logic identifies first portions of the data that match the first data pattern and second portions of the data that match the second data pattern, the control logic can determine whether there are more portions matching the first data pattern or more portions matching the second data pattern. The control logic can select the more prevalent data pattern (e.g., the data pattern with more matching portions) to remove from the data to generate the compressed data.

At operation 706, the control logic generates a compressed data signal. The compressed data signal is generated based on the compressed data and the metadata. In some embodiments, the compressed data signal is transmitted as a data frame. In some embodiments, the control logic determines whether a combination of the compressed data and the corresponding metadata is smaller than the original data. If the combination is not smaller than the original data, then the control logic forgoes generating the compressed data signal and instead generates an uncompressed data signal based on the original data.

At operation 707, the control logic causes the compressed data signal to be transmitted via the communication network.

Figure 8:
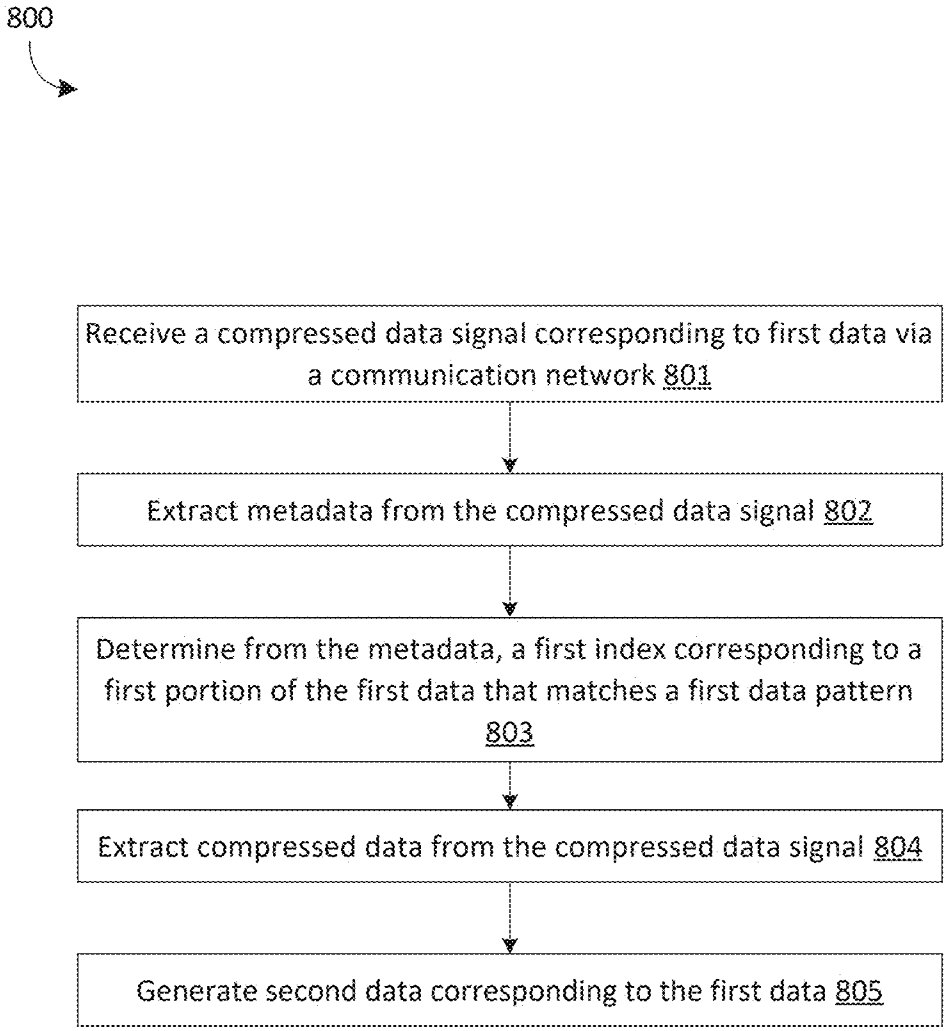
FIG. 8 is a flow diagram of an example method for compression of sparse communications over a C2C interconnect, according to some aspects of the disclosure.

FIG. 8 is a flow diagram of an example method 800 for compression of sparse communications over a C2C interconnect, according to aspects of the disclosure. The method 800 can be performed by control logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the control logic 140A or the compression module 141A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 801, control logic performing the method 800 receives a compressed data signal from a communication network. The compressed data signal corresponds to first data. In some embodiments, the first data is transmitted as the compressed data signal by another device (e.g., a device not performing the method 800).

At operation 802, the control logic extracts metadata from the compressed data signal. In some embodiments, the metadata is extracted responsive to receiving the compressed data signal.

At operation 803, the control logic determines from the metadata, a first index corresponding to a first portion of the first data that matches a first data pattern. In some embodiments, the control logic determines the first data pattern from the metadata. In some embodiments, the control logic determines a second index of a second portion of the first data (or respective indices of additional portions) that matches the first data pattern. In some embodiments, the control logic determines a second index of a second portion of the first data that matches a second data pattern.

At operation 804, the control logic extracts compressed data from the compressed data signal. The compressed data corresponds to the first data. That is, the compressed data can be a compressed version of the first data.

At operation 805, the control logic generates second data corresponding to the first data. The control logic inserts the first data pattern into the compressed data at the first index of the first data. In some embodiments, to insert the first data pattern into the compressed data at the first index of the first data, the control logic shifts a portion of the compressed data from the first index to a second index. In embodiments where a second portion of the first data (or respective indices of additional portions) matches the first data pattern, the control logic can insert the first data pattern at the second index corresponding to the second portion (or at each of the respective indices). In embodiments where a second portion of the first data matches a second data pattern, the control logic can insert the second data pattern at the second index corresponding to the second portion. In some embodiments, the control logic can shift a third portion of the first data from the first index to a third index and a fourth portion of the first data from the second index to a fourth index, as described above with reference to FIG. 3B.

Computer Systems

Figure 9:
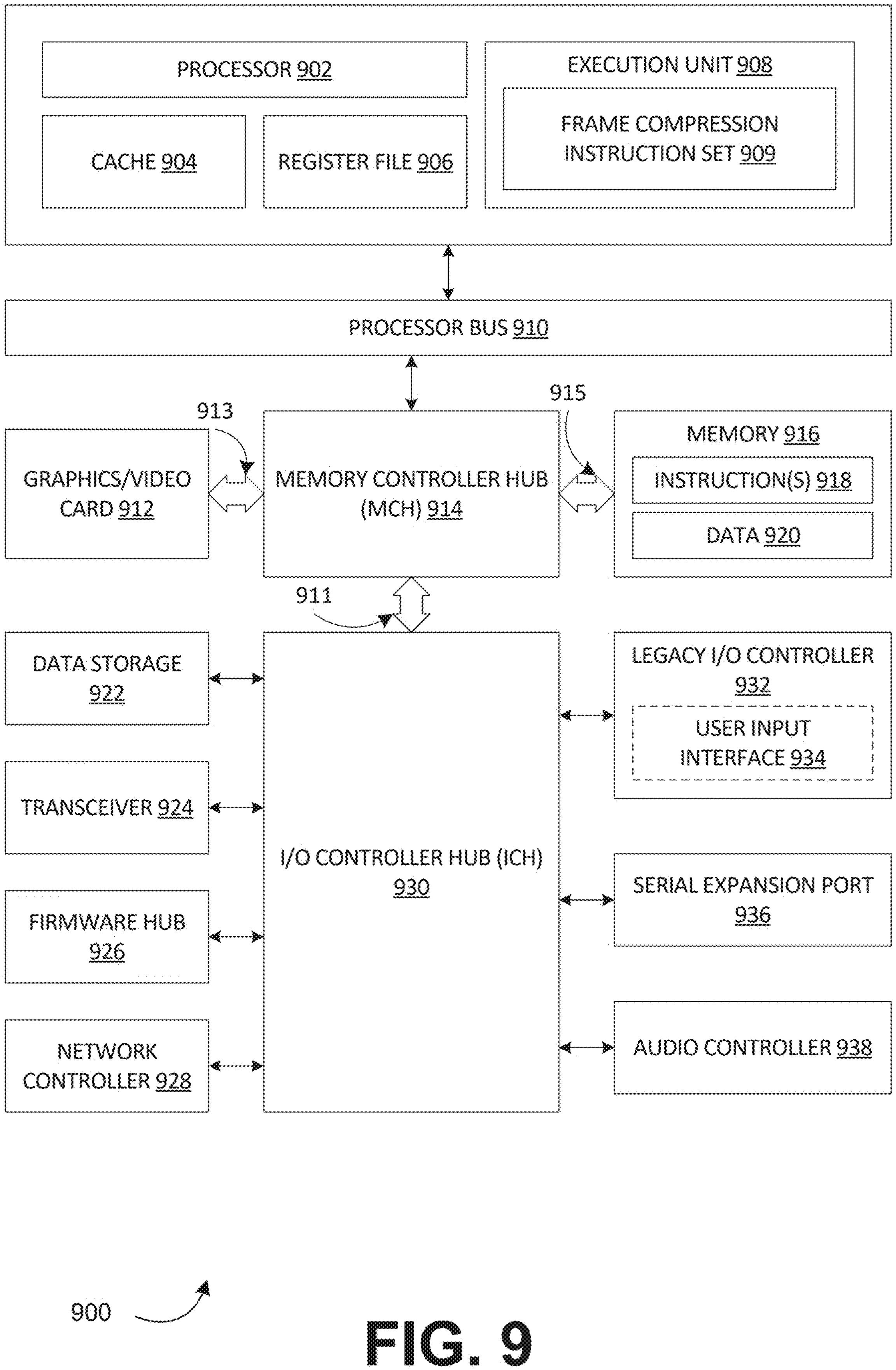
FIG. 9 is a block diagram illustrating an exemplary computer system which can be a system with interconnected devices and components, a system-on-a-chip (SOC), or some combination thereof, according to aspects of the disclosure.

FIG. 9 is a block diagram illustrating an exemplary computer system, such as computer system 900, which can be a system with interconnected devices and components, a system-on-a-chip (SOC), or some combination thereof, according to aspects of the disclosure. In some embodiments, computer system 900 can include, without limitation, a component, such as a processor 902, to employ execution units including logic to perform algorithms for process data, in accordance with the present disclosure, such as in the embodiments described herein. In some embodiments, computer system 900 can include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) can also be used. In some embodiments, computer system 900 can execute a version of WINDOWS' operating system available from Microsoft Corporation of Redmond, Wash., although other operating systems (UNIX and Linux, for example), embedded software, and/or graphical user interfaces, can also be used.

Embodiments can be used in other devices such as handheld devices and embedded applications. Some examples of handheld devices include cellular phones, Internet Protocol devices, digital cameras, personal digital assistants (PDAs), and handheld PCs. In some embodiments, embedded applications can include a microcontroller, a digital signal processor (DSP), a system on a chip, network computers (NetPCs), set-top boxes, network hubs, wide area network (WAN) switches, or any other system that can perform one or more instructions in accordance with at least one embodiment.

In some embodiments, computer system 900 can include, without limitation, processor 902 that can include, without limitation, one or more execution units 908 to perform operations according to techniques described herein. In some embodiments, computer system 900 is a single-processor desktop or server system, but in another embodiment, the computer system 900 can be a multiprocessor system. In some embodiments, processor 902 can include, without limitation, a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In some embodiments, processor 902 can be coupled to a processor bus 910 that can transmit data signals between processor 902 and other components in computer system 900.

In some embodiments, processor 902 can include, without limitation, a Level-1 (L1) internal cache memory (cache) cache 904. In some embodiments, processor 902 can have a single internal cache or multiple levels of internal cache. In some embodiments, the cache memory can reside external to processor 902. Other embodiments can also include a combination of both internal and external caches depending on particular implementation and needs. In some embodiments, register file 906 can store different types of data in various registers, including and without limitation, integer registers, floating-point registers, status registers, and instruction pointer registers.

In some embodiments, an execution unit 908, including and without limitation, logic to perform integer and floating-point operations, also reside in processor 902. In some embodiments, processor 902 can also include a microcode (ucode) read-only memory (ROM) that stores microcode for certain macro instructions. In some embodiments, execution unit 908 can include logic to handle a low-power frame instruction set 909. In some embodiments, by including low-power frame instruction set 909 in an instruction set of a general-purpose processor, such as processor 902, along with associated circuitry to execute instructions, operations used by many multimedia applications can be performed using packed data in a general-purpose processor, such as processor 902. In one or more embodiments, many multimedia applications can be accelerated and executed more efficiently by using the full width of a processor's data bus for performing operations on packed data, which can eliminate the need to transfer smaller units of data across the processor's data bus to perform one or more operations one data element at a time.

In some embodiments, execution unit 908 can also be used in microcontrollers, embedded processors, graphics devices, DSPs, and other types of logic circuits. In some embodiments, computer system 900 can include, without limitation, a memory 916. In some embodiments, memory 916 can be implemented as a Dynamic Random Access Memory (DRAM) device, a Static Random Access Memory (SRAM) device, a flash memory device, or other memory devices. In some embodiments, memory 916 can store instruction(s) 918 and/or data 920 represented by data signals that can be executed by processor 902.

In some embodiments, the system logic chip can be coupled to processor bus 910 and memory 916. In some embodiments, the system logic chip can include, without limitation, a memory controller hub (MCH), such as MCH 914, and processor 902 can communicate with MCH 914 via processor bus 910. In some embodiments, MCH 914 can provide a high bandwidth memory path 915 to memory 916 for instruction and data storage and for storage of graphics commands, data, and textures. In some embodiments, MCH 914 can direct data signals between processor 902, memory 916, and other components in computer system 900 and bridge data signals between processor bus 910, memory 916, and a system input/output (I/O) 911. In some embodiments, a system logic chip can provide a graphics port for coupling to a graphics controller. In some embodiments, MCH 914 can be coupled to memory 916 through a high bandwidth memory path 915, and graphics/video card 912 can be coupled to MCH 914 through an Accelerated Graphics Port (AGP) interconnect 913.

In some embodiments, computer system 900 can use the system I/O 911 that is a proprietary hub interface bus to couple the MCH 914 to I/O controller hub (ICH), such as ICH 930. In some embodiments, ICH 930 can provide direct connections to some I/O devices via a local I/O bus. In some embodiments, a local I/O bus can include, without limitation, a high-speed I/O bus for connecting peripherals to memory 916, chipset, and processor 902. Examples can include, without limitation, data storage 922, a transceiver 924, a firmware hub (flash Basic Input/Output System (BIOS)) 926, a network controller 928, a legacy I/O controller 932 containing a user input interface 934, a serial expansion port 936, such as Universal Serial Bus (USB), and an audio controller 938. In some embodiments, data storage 922 can include a hard disk drive, a floppy disk drive, a compact disc read-only memory (CD-ROM) device, a flash memory device, or other mass storage devices.

In some embodiments, FIG. 9 illustrates a computer system 900, which includes interconnected hardware devices or "chips," whereas, in other embodiments, FIG. 9 can illustrate an exemplary System on a Chip (SoC). In some embodiments, devices can be interconnected with proprietary interconnects, standardized interconnects (e.g., Peripheral Component Interconnect buses (e.g., PCI, PCI Express)), or some combination thereof. In some embodiments, one or more components of computer system 900 are interconnected using compute express link (CXL) interconnects.

Figure 10:
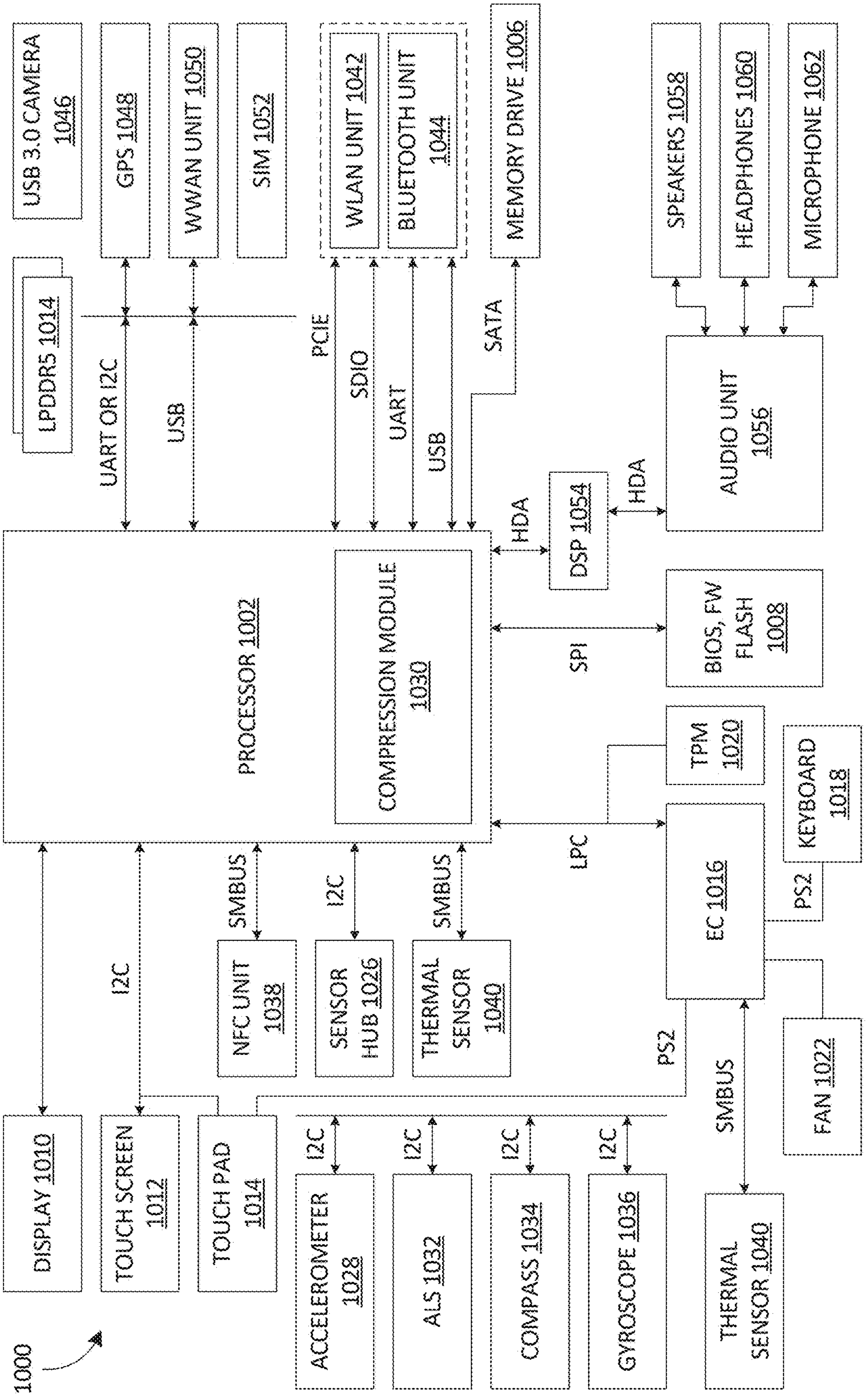
FIG. 10 is a block diagram illustrating an electronic device for utilizing a processor, according to aspects of the disclosure.

FIG. 10 is a block diagram illustrating an electronic device 1000 for utilizing a processor 1002, according to aspects of the disclosure. In some embodiments, electronic device 1000 can be, for example, and without limitation, a notebook, a tower server, a rack server, a blade server, a laptop, a desktop, a tablet, a mobile device, a phone, an embedded computer, or any other suitable electronic device.

In some embodiments, electronic device 1000 can include, without limitation, processor 1002 communicatively coupled to any suitable number or kind of components, peripherals, modules, or devices. In some embodiments, processor 1002 coupled using a bus or interface, such as an Inter-Integrated Circuit (I2C) bus, a System Management Bus (SMBus), a Low Pin Count (LPC) bus, a Serial Peripheral Interface (SPI), a High Definition Audio (HDA) bus, a Serial Advance Technology Attachment (SATA) bus, a Universal Serial Bus (USB) (including USB 1.0/1/1, USB 2.0, USB 3.0/3.1 Gen1/3.1 Gen2, and USB4), or a Universal Asynchronous Receiver/Transmitter (UART) bus. In some embodiments, FIG. 10 illustrates a system, which includes interconnected hardware devices or "chips," whereas in other embodiments, FIG. 10 can illustrate an exemplary System on a Chip (SoC). In some embodiments, devices illustrated in FIG. 10 can be interconnected with proprietary interconnects, standardized interconnects (e.g., PCIe), or some combination thereof. In some embodiments, one or more components of FIG. 10 are interconnected using compute express link (CXL) interconnects.

In some embodiments, FIG. 10 can include a display 1010, a touch screen 1012, a touch pad 1014, a Near Field Communications unit (NFC) 1038, a sensor hub 1026, a thermal sensor 1040, an Express Chipset (EC), such as EC 1016, a Trusted Platform Module (TPM), such as TPM 1020, BIOS/firmware (FW)/flash memory, such as BIOS, FW Flash 1008, a DSP 1054, a memory drive 1006 such as a Solid State Disk (SSD) or a Hard Disk Drive (HDD), a wireless local area network unit (WLAN), such as WLAN unit 1042, a Bluetooth unit 1044, a Wireless Wide Area Network unit (WWAN), such as WWAN unit 1050, a Global Positioning System (GPS) 1048, a camera (USB 3.0 camera) 1046, such as a USB 3.0 camera, and/or a Low Network bandwidth Double Data Rate (LPDDR) memory unit, such as LPDDR5 1004 implemented in, for example, LPDDR5 standard. These components can each be implemented in any suitable manner.

In some embodiments, other components can be communicatively coupled to processor 1002 through the components discussed above. In some embodiments, processor 1002 can include a low-power frame transmission module 1030. In some embodiments, an accelerometer 1028, Ambient Light Sensor (ALS), such as ALS 1032, compass 1034, and a gyroscope 1036 can be communicatively coupled to sensor hub 1026. In some embodiments, thermal sensor 1040, a fan 1022, a keyboard 1018, and a touch pad 1014 can be communicatively coupled to EC 1016. In some embodiments, speakers 1058, headphones 1060, and microphone 1062 can be communicatively coupled to an audio unit 1056 which can, in turn, be communicatively coupled to DSP 1054. In some embodiments, audio unit 1056 can include, for example, and without limitation, an audio coder/decoder (codec) and a class-D amplifier. In some embodiments, a subscriber identification module (SIM) card, such as SIM 1052 can be communicatively coupled to WWAN unit 1050. In some embodiments, components such as WLAN unit 1042 and Bluetooth unit 1044, as well as WWAN unit 1050 can be implemented in a Next Generation Form Factor (NGFF).

Figure 11:
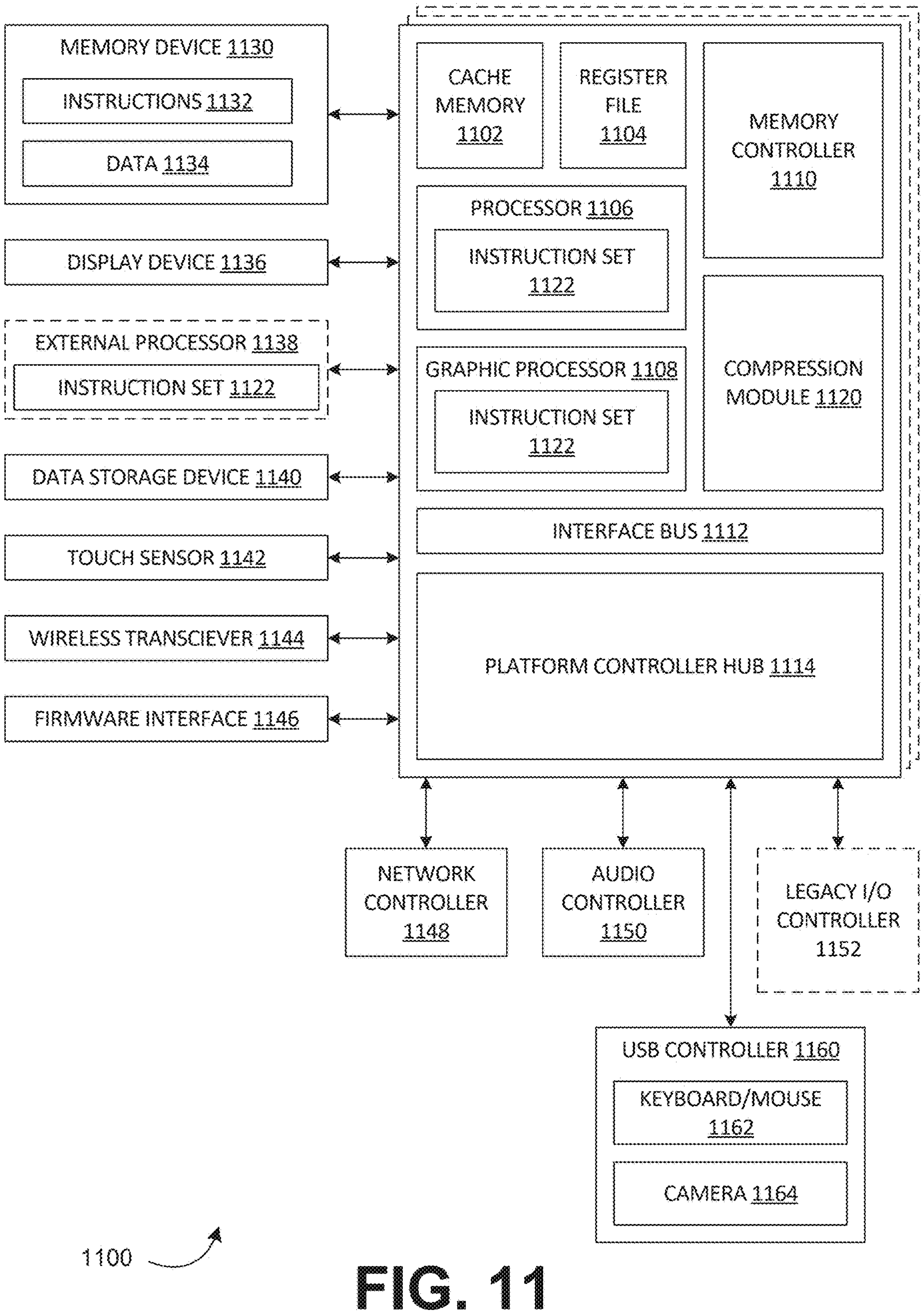
FIG. 11 is a block diagram of a processing system, according to aspects of the disclosure.

FIG. 11 is a block diagram of a processing system 1100, according to aspects of the disclosure. In some embodiments, the processing system 1100 includes cache memory 1102, register file 1104, processors 1106, graphics processors 1108, memory controller 1110, interface bus 1112, platform controller hub 1114, and low-power frame transmission module 1120. Processing system 1100 can be a single processor desktop system, a multiprocessor workstation system, or a server system having a large number of processors 1106 or graphics processors 1108. In some embodiments, the processing system 1100 is a processing platform incorporated within a system-on-a-chip (SoC) integrated circuit for use in mobile, handheld, or embedded devices.

In some embodiments, the processing system 1100 can include, or be incorporated within a server-based gaming platform, a game console, including a game and media console, a mobile gaming console, a handheld game console, or an online game console. In some embodiments, the processing system 1100 is a mobile phone, smart phone, tablet computing device, or mobile Internet device. In some embodiments, the processing system 1100 can also include, couple with, or be integrated within, a wearable device, such as a smart watch wearable device, smart eyewear device, augmented reality device, or virtual reality device. In some embodiments, the processing system 1100 is a television or set-top box device having one or more processors 1106 and a graphical interface generated by one or more graphics processors 1108.

In some embodiments, one or more processors 1106 each include one or more of the processor cores to process instructions which, when executed, perform operations for system and user software. In some embodiments, one or more processors 1106 and/or one or more graphics processors can be configured to process a portion of the low-power frame transmission (LPFT) instruction set, such as LPFT instruction set 1122. In some embodiments, LPFT instruction set 1122 can facilitate Complex Instruction Set Computing (CISC), Reduced Instruction Set Computing (RISC), or computing via a Very Long Instruction Word (VLIW). In some embodiments, processor cores can each process a different instruction set from LPFT instruction set 1122, which can include instructions to facilitate emulation of other instruction sets (not illustrated). In some embodiments, processor cores can also include other processing devices, such as a Digital Signal Processor (DSP).

In some embodiments, processors 1106 includes cache memory 1102. In some embodiments, processors 1106 can have a single internal cache or multiple levels of internal cache. In some embodiments, cache memory 1102 is shared among various components of processors 1106. In some embodiments, processors 1106 also uses an external cache (e.g., a Level-3 (L3) cache or Last Level Cache (LLC)) (not illustrated), which can be shared among processor cores using known cache coherency techniques. In some embodiments, register file 1104 is additionally included in processors 1106, which can include different types of registers for storing different types of data (e.g., integer registers, floating-point registers, status registers, and an instruction pointer register). In some embodiments, register file 1104 can include general-purpose registers or other registers.

In some embodiments, one or more processors 1106 are coupled with one or more interface bus 1112 to transmit communication signals such as address, data, or control signals between processor cores and other components in processing system 1100. In some embodiments, interface bus 1112, in one embodiment, can be a processor bus, such as a version of a Direct Media Interface (DMI) bus. In some embodiments, interface bus 1112 is not limited to a DMI bus, and can include one or more PCI buses (e.g., PCI, PCI Express), memory busses, or other types of interface busses. In some embodiments, processors 1106 include an integrated memory controller (e.g., memory controller 1110) and a platform controller hub 1114 (PCH). In some embodiments, memory controller 1110 facilitates communication between a memory device and other components of the processing system 1100, while platform controller hub 1114 provides connections to I/O devices via a local I/O bus.

In some embodiments, the memory device 1130 can be a dynamic random-access memory (DRAM) device, a static random-access memory (SRAM) device, a flash memory device, a phase-change memory device, or some other memory device having suitable performance to serve as process memory. In some embodiments, the memory device 1130 can operate as system memory for processing system 1100 to store instructions 1132 and data 1134 for use when one or more processors 1106 executes an application or process. In some embodiments, memory controller 1110 also optionally couples with an external processor 1138, which can communicate with one or more graphics processors 1108 in processors 1106 to perform graphics and media operations. In some embodiments, a display device 1136 can connect to processors 1106. In some embodiments, the display device 1136 can include one or more of an internal display device, as in a mobile electronic device or a laptop device, or an external display device attached via a display interface (e.g., DisplayPort, etc.). In some embodiments, display device 1136 can include a head-mounted display (HMD) such as a stereoscopic display device for use in virtual reality (VR) applications or augmented reality (AR) applications.

In some embodiments, the platform controller hub 1114 enables peripherals to connect to memory device 1130 and processors 1106 via a high-speed I/O bus. In some embodiments, I/O peripherals include, but are not limited to, a data storage device 1140 (e.g., hard disk drive, flash memory, etc.), a touch sensor 1142, a wireless transceiver 1144, firmware interface 1146, a network controller 1148, or an audio controller 1150.

In some embodiments, the data storage device 1140 can connect via a storage interface (e.g., SATA) or via a peripheral bus, such as a PCI bus (e.g., PCI, PCI Express). In some embodiments, touch sensor 1142 can include touch screen sensors, pressure sensors, or fingerprint sensors. In some embodiments, wireless transceiver 1144 can be a Wi-Fi transceiver, a Bluetooth transceiver, or a mobile network transceiver such as a 3G, 4G, Long Term Evolution (LTE), 5G, or 6G transceiver. In some embodiments, firmware interface 1146 enables communication with system firmware and can be, for example, a unified extensible firmware interface (UEFI). In some embodiments, the network controller 1148 can enable a network connection to a wired network. In some embodiments, a high-performance network controller (not illustrated) couples with interface bus 1112. In some embodiments, audio controller 1150 can be a multi-channel high-definition audio controller. In some embodiments, the processing system 1100 includes an optional legacy I/O controller 1152 for coupling legacy (e.g., Personal System-2 (PS/2)) devices to the processing system 1100. In some embodiments, the platform controller hub 1114 can also connect to one or more Universal Serial Bus (USB) controllers, such as USB controller 1160 to connect input devices, such as a keyboard and mouse combination (keyboard/mouse 1162), a camera 1164, or other USB input devices.

In some embodiments, an instance of memory controller 1110 and platform controller hub 1114 can be integrated into a discreet external graphics processor, such as external processor 1138. In some embodiments, the platform controller hub 1114 and/or memory controller 1110 can be external to one or more processors 1106. For example, in some embodiments, the processing system 1100 can include an external memory controller (e.g., memory controller 1110) and the platform controller hub 1114, which can be configured as a memory controller hub and peripheral controller hub within a system chipset that is in communication with the processors 1106.

Figure 12:
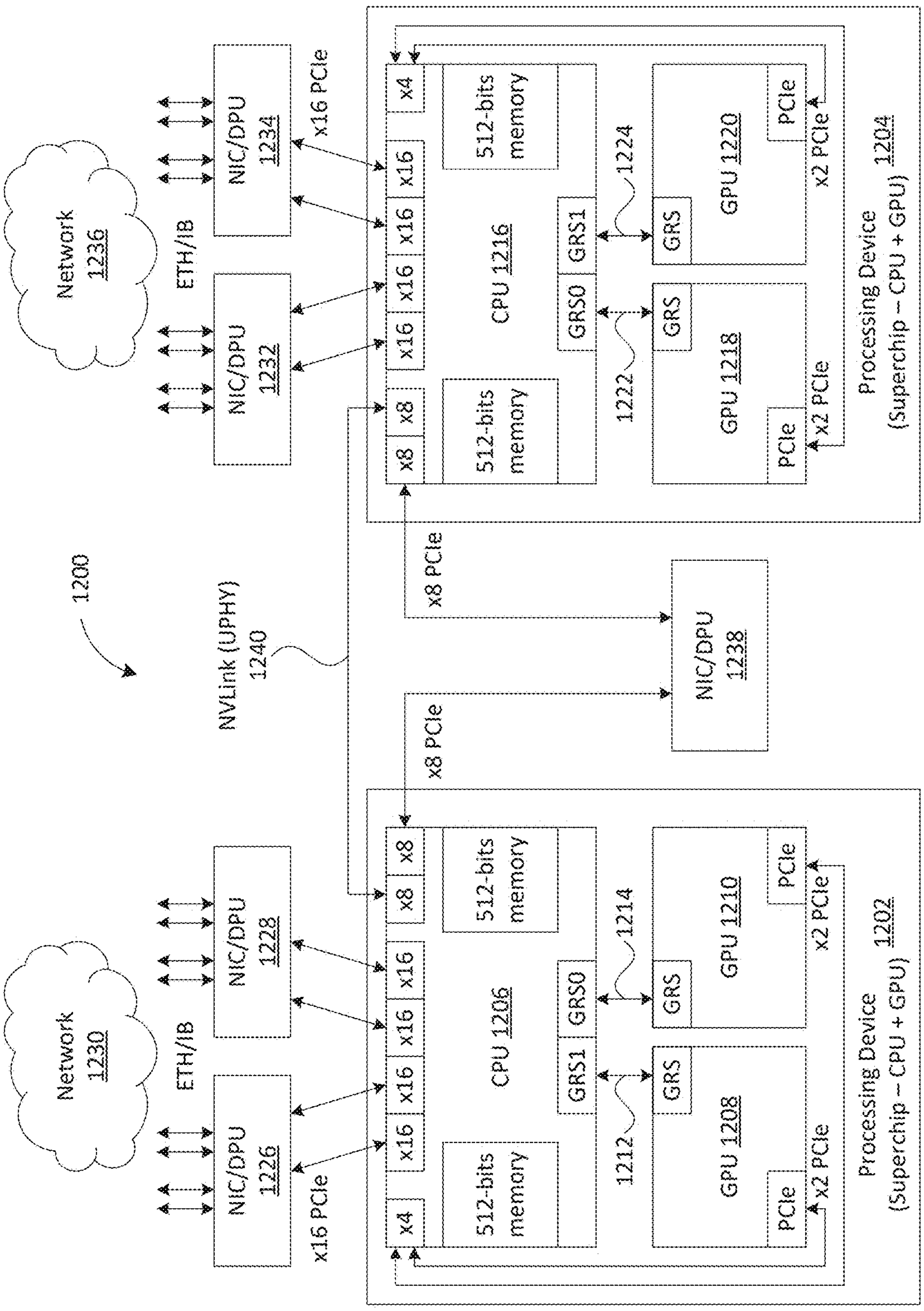
FIG. 12 is a block diagram of a computing system having two processing devices coupled to each other and multiple networks according to some aspects of the disclosure.

FIG. 12 is a block diagram of a computing system 1200 having two processing devices coupled to each other and multiple networks according to some aspects of the disclosure. The computing system 1200 is designed with multiple integrated circuits (referred to as processing devices), where each integrated circuit includes a CPU and two GPUs, forming a powerful and flexible architecture. These processing devices are interconnected via an NVLink (or other high-speed interconnect), enabling high-speed communication between the processing devices, and are also connected through a Network Interface Card (NIC) or Data Processing Unit (DPU) to ensure efficient data transfer across the computing system 1200.

The coupling of processing devices through NVLink allows for seamless data exchange and parallel processing, enhancing overall computational performance. Additionally, these processing devices are connected to multiple networks through one or more network interface cards (NICs) or DPUs, enabling the system to handle complex, multi-network tasks with high bandwidth and low latency. This configuration makes the computing system 1200 highly suitable for demanding applications that require significant processing power, such as artificial intelligence (AI), machine learning (ML), and data-intensive computing, while ensuring robust connectivity and scalability across various networked environments. The integrated circuits of the computing system 1200 can include one or more CPUs and one or more GPUs. An example architecture of a multi-GPU architecture is illustrated in FIG. 12.

As illustrated in FIG. 12, the computing system 1200 includes a processing device 1202 with a multi-GPU architecture. In particular, the processing device 1202 includes a CPU 1206, a GPU 1208, and a GPU 1210. The CPU 1206 can be coupled to the GPU 1208 via an die-to-die (D2D) or chip-to-chip (C2C) interconnect 1212, such as a Ground-Referenced Signaling interconnect (GRS interconnect). The CPU 1206 can be coupled to the GPU 1210 via a D2D or C2C interconnect 1214. The CPU 1206 can also couple to the GPU 1208 and GPU 1210 via PCIe interconnects. The CPU 1206 can be coupled to one or more network interface cards (NICs) or data processing units (DPUs), which are coupled to one or more networks. For example, as illustrated in FIG. 12, the CPU 1206 is coupled to a first NIC/DPU 1226, which is coupled to a network 1230. The CPU 1206 is also coupled to a second NIC/DPU 1228, which is coupled to the network 1230. The NIC/DPU 1226 and NIC/DPU 1228 can be coupled to the network 1230 over Ethernet (ETH) or InfiniBand (IB) connections.

The computing system 1200 also includes a processing device 1204 with a multi-GPU architecture. In particular, the processing device 1204 includes a CPU 1216, a GPU 1218, and a GPU 1220. The CPU 1216 can be coupled to the GPU 1218 via an D2D or C2C interconnect 1222. The CPU 1216 can be coupled to the GPU 1220 via a D2D or C2C interconnect 1224. The CPU 1216 can also couple to the GPU 1218 and GPU 1220 via PCIe interconnects. The CPU 1216 can be coupled to one or more NICs or DPUs, which are coupled to one or more networks. For example, as illustrated in FIG. 12, the CPU 1216 is coupled to a first NIC/DPU 1232, which is coupled to a network 1236. The CPU 1216 is also coupled to a second NIC/DPU 1234, which is coupled to the network 1236. The NIC/DPU 1232 and NIC/DPU 1234 can be coupled to the network 1236 over Ethernet (ETH) or InfiniBand (IB) connections.

In at least one embodiment, the processing device 1202 and the processing device 1204 can communication with each other via a NIC/DPU 1238, such as over PCIe interconnects. The processing device 1202 and processing device 1204 can also communicate with each other over a high-bandwidth communication interconnects 1240, such as an NVLink interconnect or other high-speed interconnects.

The computing system 1200 includes various types of interconnects. Each of the interconnects includes the transceivers or receivers that include the control logic 140A and compression module 141A of FIG. 1, as described herein.

In at least one embodiment, the computing system 1200 is used for high-speed network communication and includes a processing unit (e.g., CPU 1206, GPU 1208, GPU 1208, CPU 1216, GPU 1218, GPU 1220, NIC/DPU 1226, NIC/DPU 1228, NIC/DPU 1232, NIC/DPU 1234, or NIC/DPU 1238), and a network interface coupled to the processing unit. The network interface includes a transmitter circuit, a receiver circuit, and a controller operatively coupled to the transmitter circuit and the receiver circuit. The controller includes a compression module which can reduce the transmission of repeated data, as described above. The controller can identify and remove data patterns from the data to be transmitted. The removed data can be represented in metadata that is transmitted along with the now-compressed data. A receiving controller can use the metadata that is transmitted with compressed data to reconstruct the compressed data into the original data that was to be transmitted.

Figure 13:
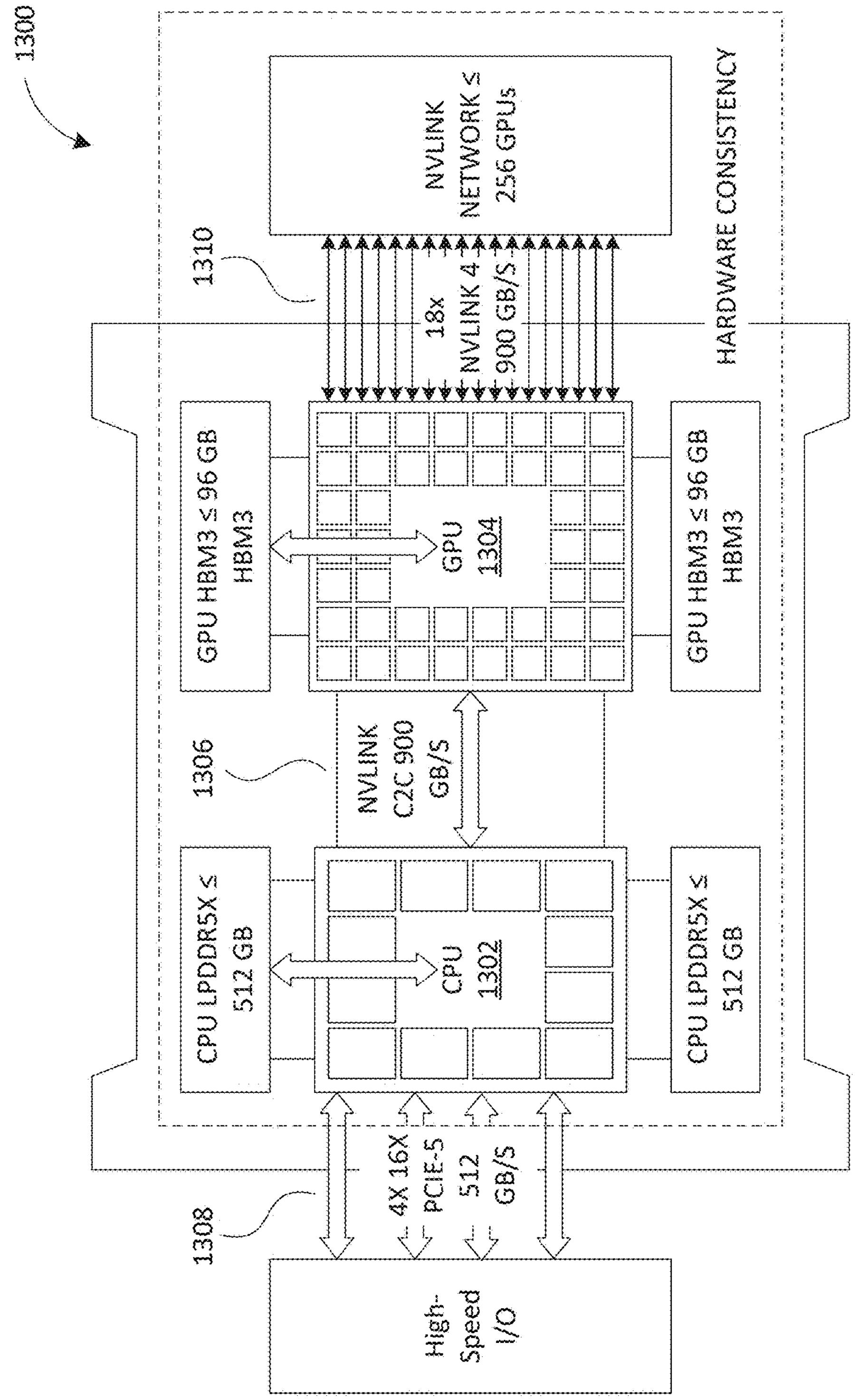
FIG. 13 is a block diagram of a computing system having a CPU and a GPU in a single integrated circuit according to some aspects of the disclosure.

FIG. 13 is a block diagram of a computing system 1300 having a CPU 1302 and a GPU 1304 in a single integrated circuit according to at least one embodiment. The computing system 1300 can be a highly integrated design where a CPU 1302 and GPU 1304 are connected on a single integrated circuit, utilizing an NVLink C2C (Chip-to-Chip) interconnect 1306 to enable fast, low-latency communication between the two processing units. This close integration allows for efficient data transfer and parallel processing between the CPU 1302 and GPU 1304, optimizing performance for complex computational tasks. The GPU elements within the computing system 1300 can be interconnected using an NVLink network, allowing for scalability to include multiple GPU elements (e.g., up to 256 as illustrated), creating a powerful, unified processing environment ideal for large-scale AI, ML, and high-performance computing applications. The NVLink network can be a GPU fabric of high-bandwidth communication interconnects 1310. Additionally, the computing system 1300 can be designed to interface with a high-speed I/O through PCIe interconnects 1308, ensuring rapid data transfer to and from external devices, further enhancing the system's capabilities in handling data-intensive tasks and providing robust connectivity to peripheral components. It should be noted that the C2C interconnects 1306 can be considered D2D interconnects since the CPU 1302 and the GPU 1304 are located on the same integrated circuit. The integrated circuit can include CPU memory (also referred to as main memory) and GPU memory, which are accessible by the CPU 1302 and the GPU 1304, respectively, over high-speed interconnects. The computing system 1300 can bring together performance of the GPU 1304 with the versatility of the CPU 1302. The CPU 1302 can be connected with a high-bandwidth and memory coherent C2C interconnects 1306 in a single integrated circuit. The computing system 1300 can support a link switch system.

The computing system 1300 includes various types of interconnects. Each of the interconnects includes the transceivers or receivers that include the control logic 140A and compression module 141A of FIG. 1, as described herein.

In at least one embodiment, the computing system 1300 is used for high-speed network communication and includes a processing unit (e.g., CPU 1302, GPU 1304, NVLink network), and a network interface coupled to the processing unit. The network interface can include the controller as described above with respect to FIG. 12.

Figure 14:
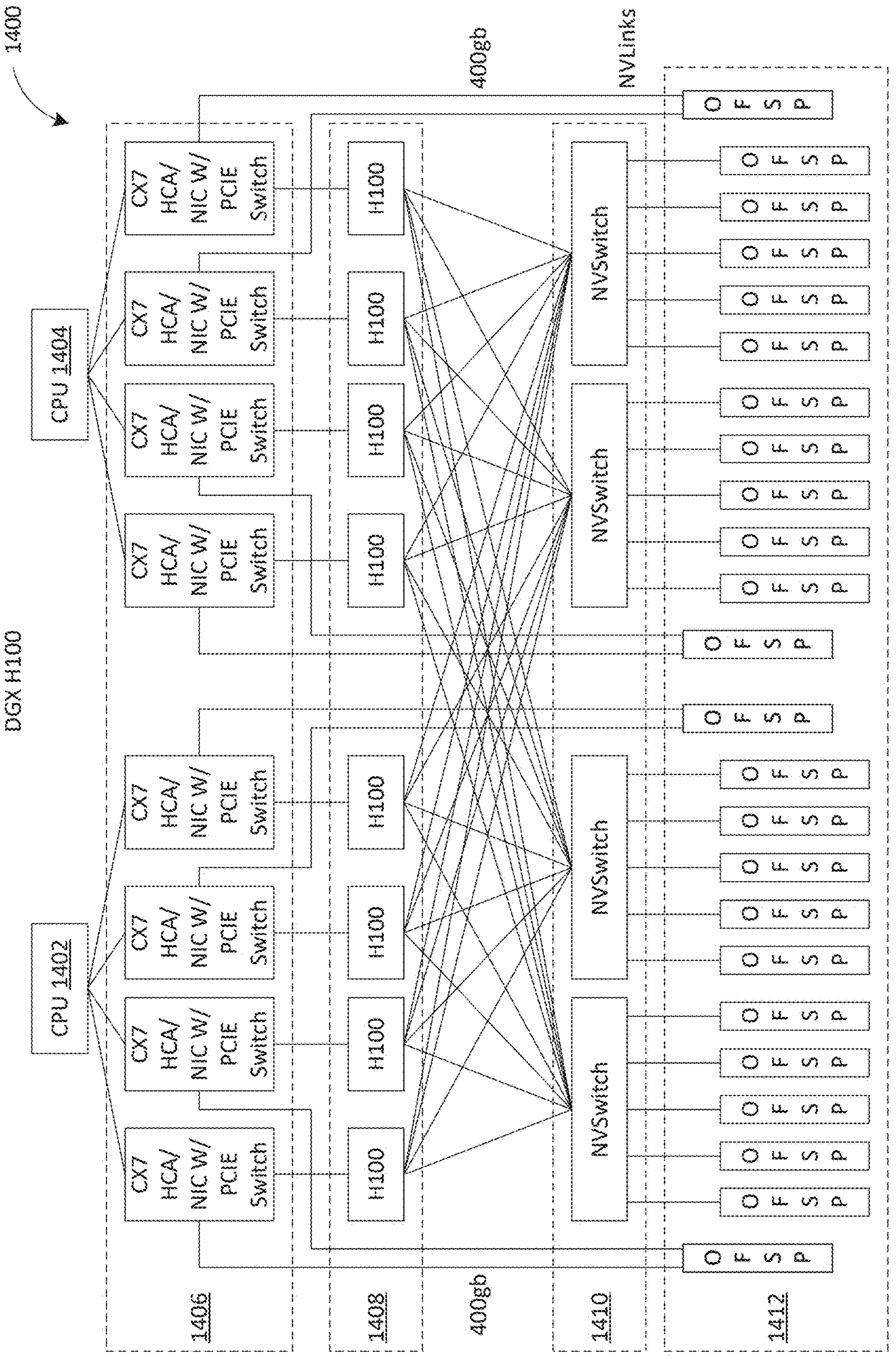
FIG. 14 is a block diagram of a computing system having tensor core GPUs according to some aspects of the disclosure.

FIG. 14 is a block diagram of a computing system 1400 having tensor core GPUs 1408 according to at least one embodiment. The computing system 1400 can be an NVIDIA© DGX H100 system which is a high-performance computing platform designed to meet the demands of AI, ML, and deep learning (DL) workloads. The computing system 1400 can include multiple tensor core GPUs 1408 (e.g., NVIDIA H100 Tensor Core GPUs). The tensor core GPUs 1408 can each be one of the integrated circuits described above with respect to FIG. 12. The tensor core GPUs 1408 can be optimized for AI/ML/DL applications, offering exceptional performance for deep learning training, inference, and high-performance computing tasks. The tensor core GPUs 1408 within the computing system 1400 are interconnected using high-speed communication interfaces like NVLinks, enabling rapid data transfer between them, which is crucial for handling large-scale AI models and datasets with low latency. This computing system 1400 is designed for scalability, allowing for the integration of additional GPUs as required, making it versatile enough for research, development, and deployment in data centers for production AI workloads. Each GPU is equipped with Tensor Cores, specialized processing units that accelerate matrix operations, a fundamental component of AI and deep learning algorithms. These Tensor Cores enable the system to perform mixed-precision calculations efficiently, balancing speed and accuracy. Given the power consumption and heat generation of multiple tensor core GPUs 1408, the computing system 1400 can include advanced cooling solutions and power management features to ensure safe operation while maintaining peak performance. It is supported by a comprehensive software ecosystem, including NVIDIA's CUDA programming model, AI frameworks like TensorFlow and PyTorch, and other HPC and AI software tools, which enable developers and researchers to harness the full power of the tensor core GPUs 1408 for their specific applications: The computing system 1400 is ideally suited for large-scale AI model training, real-time inference, scientific simulations, data analytics, and other compute-intensive tasks that require massive parallel processing power.

The tensor core GPUs 1408 can be coupled to multiple CPUs, such as CPU 1402 and CPU 1404, using switches 1406 (e.g., CX7 HCA/NIC with PCIe switch). The tensor core GPUs 1408 can be coupled to each other via switches 1410 (e.g., NVSwitches). The switches 1406 and switches 1410 can be coupled to high-speed transceiver modules 1412. The high-speed transceiver modules 1412 can be Octal Small Form-factor Pluggable (OSFP) modules. OSFP modules refer to high-speed transceiver modules designed for rapid data communication, particularly in environments requiring significant bandwidth, such as data centers and high-performance computing systems. These modules support extremely high data rates, typically up to 400 Gbps per module, with future capabilities extending to 800 Gbps or more. OSFP modules interface with the system via the PCIe interface, enabling fast and efficient data transfer between the integrated CPU-GPU components and external networks or other connected systems. Their hot-pluggable nature allows for easy insertion or removal without the need to power down the system, offering flexibility and ease of maintenance, which is crucial in critical-uptime environments. Additionally, OSFP modules are designed for high density, maximizing the number of high-speed connections within limited space, such as in densely packed server racks. By adhering to the latest networking standards, OSFP modules ensure the computing system 1400 remains capable of meeting increasing data demands and can be upgraded to support future advancements in network speeds, thus contributing to the system's overall performance and scalability.

In at least one embodiment, the computing system 1400 can be considered a data-network configuration with full-bandwidth intra-server NVLinks. In this example, all eight tensor core GPUs 1408 can simultaneously saturate eighteen NVLinks to other GPUs within the server. The bandwidth is limited by over-subscription from multiple other GPUs. In another embodiments, data-network configuration can be a half-bandwidth intra-server NVLinks. In this example, all eight tensor core GPUs 1408 can half-subscribe eighteen NVLinks to GPUs in other servers. Four tensor core GPUs 1408 can saturate eighteen NVLinks to GPUs in other servers. This is equivalent of full-bandwidth on AllReduce with Scalable Hierarchical Aggregation and Reduction Protocol (SHARP). The reduction in all-2-all (All2All) bandwidth is a balance with server complexity and costs. In at least one embodiment, all eight tensor core GPUs 1408 can independently transfer data, using Remote Direct Memory Access (RDMA) protocol, over its own dedicated switch (e.g., 400 Gb/s HCA/NIC) in an multi-rail InfiniBand/Ethernet configuration. In this example, 800 GBps of aggregate full-duplex to non-NVLink network devices.

The computing system 1400 includes various types of interconnects. Each of the interconnects includes the transceivers or receivers that include the control logic 140A and compression module 141A of FIG. 1, as described herein.

In at least one embodiment, the computing system 1400 is used for high-speed network communication and includes a processing unit (e.g., CPU 1402, CPU 1402, switches 1406, tensor core GPUs 1408, switches 1410, high-speed transceiver modules 1412), and a network interface coupled to the processing unit. The network interface can the controller as described above with respect to FIG. 12.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set can be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., can be either A or B or C, or any nonempty subset of a set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In some embodiments, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In some embodiments, code is stored on a computer-readable storage medium, for example, in form of a computer program comprising a plurality of instructions executable by one or more processors. In some embodiments, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In some embodiments, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in some embodiments, comprises multiple non-transitory computer-readable storage media and one or more of individual non-transitory storage media of multiple non-transitory computer-readable storage media lacks all of the code while multiple non-transitory computer-readable storage media collectively store all of the code. In some embodiments, executable instructions are executed such that different instructions are executed by different processors—for example, a non-transitory computer-readable storage medium stores instructions, and a main central processing unit (CPU) executes some of the instructions while a graphics processing unit (GPU) executes other instructions. In some embodiments, different components of a computer system have separate processors, and different processors execute different subsets of instructions.

Accordingly, in some embodiments, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, can be used. It should be understood that these terms cannot be intended as synonyms for each other. Rather, in particular examples, "connected" or "coupled" can be used to indicate that two or more elements are in direct or indirect physical or electrical contact with each other. "Coupled" can also mean that two or more elements are not in direct contact with each other but yet still co-operate or interact with each other.

Unless specifically stated otherwise, it can be appreciated that throughout specification terms such as "processing," "computing," "calculating," "determining," or like, refer to action and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" can refer to any device or portion of a device that processes electronic data from registers and/or memory and transform that electronic data into other electronic data that can be stored in registers and/or memory. As non-limiting examples, a. "processor" can be a CPU or a GPU. A "computing platform" can comprise one or more processors. As used herein, "software" processes can include, for example, software and/or hardware entities that perform work over time, such as tasks, threads, and intelligent agents. Also, each process can refer to multiple processes for carrying out instructions in sequence or in parallel, continuously, or intermittently. The terms "system" and "method" are used herein interchangeably insofar as a system can embody one or more methods, and methods can be considered a system.

In the present document, references can be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References can also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures can be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A transmitter device comprising:
transmitter logic to transmit data signals via a communication network; and
control logic coupled to the transmitter logic, the control logic to:
receive data to be sent via the communication network;
determine whether a first portion of the data matches a first data pattern;
identify a first data index corresponding to the first portion of the data;
generate metadata for the data based on the first data index, wherein the metadata comprises a pattern indication corresponding to the first data pattern;
generate compressed data by removing the first portion of the data at the first data index;
generate a compressed data signal based on the compressed data and the metadata; and
cause the compressed data signal to be transmitted via the communication network.

2. The transmitter device of claim 1, wherein the metadata for the data is further generated based on the first data pattern.

3. The transmitter device of claim 1, wherein the data comprises a plurality of portions of data, wherein each portion of the plurality of portions corresponds to a respective data index indicating a position within the data, wherein to generate the compressed data, the control logic further to:
shift a second portion of the data from a second data index to the first data index.

4. The transmitter device of claim 1, the control logic further to:
determine that a second portion of the data corresponds to the first data pattern;
identify a second data index indicating a position of the second portion within the data;
generate the metadata for the data based on the first data index and the second data index; and
generate the compressed data by further removing the second portion of the data at the second data index.

5. The transmitter device of claim 4, the control logic further to:
shift a third portion of the data from a third data index to the first data index; and
shift a fourth portion of the data from a fourth data index to the second data index.

6. The transmitter device of claim 1, the control logic further to:
determine whether a second portion of the data corresponds to a second data pattern;
determine whether a first number of portions of the data corresponding to the first data pattern is greater than or equal to a second number of portions of the data corresponding to the second data pattern, wherein the first number of portions comprises the first portion and the second number of portions comprises the second portion;
identify a respective data index for each portion of the first number of portions, responsive to determining the first number of portions is greater than or equal to the second number of portions;
generate the metadata for the data based on each respective data index for each portion of the first number of portions of the data; and
generate the compressed data by further removing each portion of the first number of portions from the data at each respective data index.

7. The transmitter device of claim 6, wherein the compressed data signal is generated responsive to determining that a first size of the metadata is less than a second size of the first number of portions of the data.

8. The transmitter device of claim 1, the control logic further to:
determine whether a second portion of the data corresponds to a second data pattern;
identify a second data index indicating a position of the second portion within the data;
generate the metadata for the data based on the first data index corresponding to the first portion matching the first data pattern and the second data index corresponding to the second portion matching the second data pattern; and
generate the compressed data by removing the first portion of the data at the first data index and removing the second portion of the data at the second data index.

9. A receiver device comprising:
receiver logic to receive data signals via a communication network; and
control logic coupled to the receiver logic, the control logic to:
cause the receiver logic to receive a compressed data signal corresponding to first data via the communication network;
extract metadata from the compressed data signal, wherein the metadata comprises a pattern indication corresponding to a first data pattern;
determine from the metadata, a first data index corresponding to a first portion of the first data that matches the first data pattern;
extract compressed data from the compressed data signal, the compressed data corresponding to the first data; and
generate second data by inserting the first data pattern into the compressed data at the first data index.

10. The receiver device of claim 9, the control logic further to determine the first data pattern from the metadata.

11. The receiver device of claim 9, wherein the first data comprises a plurality of data portions, wherein each portion of the plurality of data portions corresponds to a respective data index indicating a position within the first data, wherein to generate the second data, the control logic further to:
shift a portion of the compressed data from the first data index to a second data index.

12. The receiver device of claim 9, the control logic further to: determine from the metadata, a second data index indicating a position of a second portion of the first data that matches the first data pattern; and
generate the second data by inserting the first data pattern into the compressed data at the first data index and the second data index of the first data responsive to determining the second portion matches the first data pattern.

13. The receiver device of claim 12, the control logic further to:
shift a third portion of the first data from the first data index to a third data index; and shift a fourth portion of the first data from the second data index to a fourth data index.

14. The receiver device of claim 9, the control logic further to:

determine from the metadata, a second data index indicating a position of a second portion of the first data that matches a second data pattern; and generate the second data by inserting the first data pattern into the compressed data at the first data index and inserting the second data pattern into the compressed data at the second data index responsive to determining the second portion of the first data matches the second data pattern.

15. A system comprising:

a communication network;

a receiver device to receive a compressed data signal via the communication network; and a transmitter device to send the compressed data signal via the communication network, the transmitter device comprising a controller coupled to a transmitter, the controller to:

receive first data to be sent via the communication network;

determine whether a first portion of the first data matches a first data pattern;

identify a first data index corresponding to the first portion responsive to determining that the first portion matches the first data pattern;

generate first metadata for the first data based on the first data index, wherein the first metadata comprises a pattern indication corresponding to the first data pattern;

obtain first compressed data by removal of the first portion of the first data at the first data index;

generate the compressed data signal based on the first compressed data and the first metadata; and cause the transmitter to transmit the compressed data signal to the receiver device via the communication network.

16. The system of claim 15, wherein the first metadata for the first data is further generated by the controller based on the first data pattern.

17. The system of claim 15, wherein the receiver device comprises a respective controller coupled to a receiver, the respective controller of the receiver device is to:

cause the receiver to receive the compressed data signal via the communication network;

extract the first metadata from the compressed data signal;

determine from the first metadata, the first data index indicating a position of the first portion within the first data; and generate second data corresponding to the first data by inserting the first data pattern into the first compressed data at the first data index.

18. The system of claim 17, wherein the respective controller is further to determine the first data pattern from the first metadata.

19. The system of claim 15, wherein the controller of the transmitter device is further to:

determine that a second portion of the first data corresponds to the first data pattern; identify a second data index indicating a position of the second portion within the first data;

generate the first metadata for the first data based on the first data index and the second data index; and generate the first compressed data by further removing the second portion of the first data at the second data index.

20. The system of claim 19, wherein a respective controller of the receiver device is to:

determine from the first metadata, the second data index indicating a position of the second portion of the first data that matches the first data pattern; and generate second data by inserting the first data pattern into the first compressed data at the first data index and the second data index of the first data responsive to determining the second data index corresponding to the second portion that matches the first data pattern.

21. A system for high-speed network communication, the system comprising:

one or more processing units; and a network interface coupled to the one or more processing units, wherein the network interface comprises a transmitter device, wherein the transmitter device comprises:

transmitter logic to transmit data signals via a communication network; and control logic coupled to the transmitter logic, the control logic to:

receive data to be sent via the communication network;

determine whether a first portion of the data corresponds to a first data pattern;

identify a first data index corresponding to the first portion of the data;

generate metadata for the data based on the first data index, wherein the metadata comprises a pattern indication corresponding to the first data pattern;

generate compressed data by removing the first portion of the data at the first data index;

generate a compressed data signal based on the compressed data and the metadata; and cause the compressed data signal to be transmitted via the communication network.

22. The system of claim 21, wherein the metadata for the data is further generated based on the first data pattern.

23. The system of claim 21, wherein the data comprises a plurality of portions of data, wherein each portion of the plurality of portions corresponds to a respective data index indicating a position within the data, wherein to generate the compressed data, the control logic further to:

shift a second portion of the data from a second data index to the first data index.

24. The system of claim 21, the control logic further to:

determine that a second portion of the data corresponds to the first data pattern;

identify a second data index indicating a position of the second portion within the data;

generate the metadata for the data based on the first data index and the second data index; and generate the compressed data by further removing the second portion of the data at the second data index.

25. The system of claim 24, the control logic further to:

shift a third portion of the data from a third data index to the first data index; and shift a fourth portion of the data from a fourth data index to the second data index.

26. The system of claim 21, the control logic further to:

determine whether a second portion of the data corresponds to a second data pattern;

determine whether a first number of portions of the data corresponding to the first data pattern is greater than or equal to a second number of portions of the data corresponding to the second data pattern, wherein the first number of portions comprises the first portion and the second number of portions comprises the second portion;

identify a respective data index for each portion of the first number of portions, responsive to determining the first number of portions is greater than or equal to the second number of portions;

generate the metadata for the data based on each respective data index for each portion of the first number of portions of the data; and generate the compressed data by further removing each portion of the first number of portions from the data at each respective data index.

27. The system of claim 26, wherein the compressed data signal is generated responsive to determining that a first size of the metadata is less than a second size of the first number of portions of the data.

28. The system of claim 21, the control logic further to:

determine whether a second portion of the data corresponds to a second data pattern;

identify a second data index indicating a position of the second portion within the data;

generate the metadata for the data based on the first data index corresponding to the first portion matching the first data pattern and the second data index corresponding to the second portion matching the second data pattern; and generate the compressed data by removing the first portion of the data at the first data index and removing the second portion of the data at the second data index.

29. A receiver device comprising:

receiver logic to receive data signals via a communication network; and control logic coupled to the receiver logic, the control logic to:

cause the receiver logic to receive a compressed data signal corresponding to first data via the communication network;

extract metadata from the compressed data signal, wherein the metadata comprises a pattern indication corresponding to a first data pattern;

determine from the metadata, a first data index indicating a position within the first data of a first portion that matches the first data pattern;

extract compressed data from the compressed data signal; and generate second data corresponding to the first data by inserting the first data pattern into the compressed data at the first data index.

30. The receiver device of claim 29, the control logic further to determine the first data pattern from the metadata.

31. The receiver device of claim 29, wherein the first data comprises a plurality of data portions, wherein each portion of the plurality of data portions corresponds to a respective data index indicating a position within the first data, wherein to generate the second data, the control logic further to:

shift a second portion of the compressed data from the first data index to a second data index.

32. The receiver device of claim 29, the control logic further to:

determine from the metadata, a second data index indicating a position of a second portion of the first data that matches the first data pattern; and generate the second data by inserting the first data pattern into the compressed data at the first data index and the second data index of the first data responsive to determining the second portion matches the first data pattern.

33. The receiver device of claim 32, the control logic further to:

shift a third portion of the first data from the first data index to a third data index; and shift a fourth portion of the first data from the second data index to a fourth data index.

34. The receiver device of claim 29, the control logic further to:

determine from the metadata, a second data index indicating a position of a second portion of the first data that matches a second data pattern; and generate the second data by inserting the first data pattern into the compressed data at the first data index and inserting the second data pattern into the compressed data at the second data index responsive to determining the second portion of the first data matches the second data pattern.

* * * * *